(12) United States Patent
Lee et al.

(10) Patent No.: US 12,377,435 B2
(45) Date of Patent: Aug. 5, 2025

(54) DUAL SLOT DIE COATER INCLUDING AIR VENT

(71) Applicant: LG Energy Solution, Ltd., Seoul (KR)

(72) Inventors: Taek-Soo Lee, Daejeon (KR);
Shin-Wook Jeon, Daejeon (KR);
Sang-Hoon Choy, Daejeon (KR);
Man-Hyeong Kim, Daejeon (KR);
Young-Gon Kim, Daejeon (KR);
Young-Joon Jo, Daejeon (KR); Jin-Ho Cho, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 201 days.

(21) Appl. No.: 18/008,594

(22) PCT Filed: Oct. 7, 2021

(86) PCT No.: PCT/KR2021/013830
§ 371 (c)(1),
(2) Date: Dec. 6, 2022

(87) PCT Pub. No.: WO2022/102979
PCT Pub. Date: May 19, 2022

(65) Prior Publication Data
US 2023/0219112 A1 Jul. 13, 2023

(30) Foreign Application Priority Data

Nov. 13, 2020 (KR) .......................... 10-2020-0152315
Nov. 13, 2020 (KR) .......................... 10-2020-0152337

(51) Int. Cl.
*B05C 5/02* (2006.01)
*H01M 10/04* (2006.01)

(52) U.S. Cl.
CPC ....... *B05C 5/0262* (2013.01); *H01M 10/0404* (2013.01)

(58) Field of Classification Search
None
See application file for complete search history.

(56) References Cited

U.S. PATENT DOCUMENTS 5,425,967 A * 6/1995 Tomaru ................. B05C 5/0254
118/411
5,464,577 A * 11/1995 Leonard ................ B05C 5/0262
425/141

(Continued)

FOREIGN PATENT DOCUMENTS

CN 109261438 A 1/2019
CN 110049824 A 7/2019

(Continued)

OTHER PUBLICATIONS

Written Opinion of The International Searching Authority for PCT/KR2021/013830 mailed Jan. 20, 2022. 4pgs. (Year: 2022).*

(Continued)

*Primary Examiner* — Jethro M. Pence
(74) *Attorney, Agent, or Firm* — Lerner David LLP

(57) ABSTRACT

Disclosed is a dual slot die coater capable of discharging a coating solution through an outlet after removing air bubbles contained in the coating solution. The dual slot die coater according to the present disclosure includes a first air vent installed in the first manifold region and a second air vent installed in the second manifold region.

20 Claims, 18 Drawing Sheets

(56) References Cited

U.S. PATENT DOCUMENTS

| | | | |
|---|---|---|---|
| 6,410,094 B2 * | 6/2002 | Mandai | G03C 1/74 |
| | | | 118/410 |
| 6,833,157 B2 * | 12/2004 | Mandai | G03C 1/74 |
| | | | 118/62 |
| 7,018,474 B2 * | 3/2006 | Mandai | B05C 5/0254 |
| | | | 118/410 |
| 7,621,737 B2 | 11/2009 | Ciliske et al. | |
| 11,642,692 B2 * | 5/2023 | Horinouchi | H01M 4/04 |
| | | | 29/623.5 |
| 11,819,876 B2 * | 11/2023 | Kim | B05C 5/0245 |
| 11,850,627 B2 * | 12/2023 | Horinouchi | H01M 4/0404 |
| 2006/0257574 A1 * | 11/2006 | Pekurovksy | B05C 5/0254 |
| | | | 118/410 |
| 2013/0025535 A1 | 1/2013 | Choi et al. | |
| 2018/0250701 A1 * | 9/2018 | Kuenne | B29C 48/302 |
| 2019/0351446 A1 | 11/2019 | Lee et al. | |
| 2022/0016665 A1 | 1/2022 | Lee et al. | |
| 2022/0134378 A1 | 5/2022 | Kim et al. | |

FOREIGN PATENT DOCUMENTS

| | | | |
|---|---|---|---|
| CN | 113646093 A | 11/2021 | |
| JP | H0568927 A | 3/1993 | |
| JP | 2015026471 A | 2/2015 | |
| JP | 2016073951 A | 5/2016 | |
| JP | 2017047393 A | 3/2017 | |
| JP | 2018122283 A | 8/2018 | |
| JP | 6745690 B2 | 8/2020 | |
| JP | 2020179320 A | 11/2020 | |
| KR | 101107651 B1 | 1/2012 | |
| KR | 20140144135 A | 12/2014 | |
| KR | 20160099852 A | 8/2016 | |
| KR | 101692525 B1 | 1/2017 | |
| KR | 20190019827 A | 2/2019 | |
| KR | 20200037662 A | 4/2020 | |
| KR | 20200114417 A | 10/2020 | |

OTHER PUBLICATIONS

International Search Report for PCT/KR2021/013830 mailed Jan. 20, 2022. 3 pgs.

Extended European Search Report including Written Opinion for Application No. 21892149.2 dated Jan. 19, 2024, pp. 1-9.

* cited by examiner

DUAL SLOT DIE COATER INCLUDING AIR VENT

CROSS-REFERENCE TO RELATED APPLICATIONS

The present application is a national phase entry under 35 U.S.C. § 371 of International Application No. PCT/KR2021/013830, filed on Oct. 7, 2021, which claims priority from Korean Patent Application No.s 10-2020-0152315 and 10-2020-0152337, filed on Nov. 13, 2020 in the Republic of Korea, the disclosures of which are incorporated herein by reference.

TECHNICAL FIELD

The present disclosure relates to a slot die coater for forming a coating layer by discharging a coating solution on a substrate, and more particularly, to a dual slot die coater including two slots so as to simultaneously form a two-layer coating layer.

BACKGROUND ART

As technology development and demand for mobile devices increase, the demand for secondary batteries as an energy source is rapidly increasing, and such secondary batteries essentially include an electrode assembly that is a power generation element. The electrode assembly has a form in which a positive electrode, a separator, and a negative electrode are stacked at least once, and the positive electrode and the negative electrode are manufactured by coating a positive electrode active material slurry and a negative electrode active material slurry, respectively, on a current collector made of aluminum foil and copper foil, and followed by drying. In order to make the charge/discharge characteristics of the secondary battery uniform, the positive electrode active material slurry and the negative electrode active material slurry should be uniformly coated on the current collector, and a slot die coater has been conventionally used.

In the method for manufacturing an electrode using a slot die coater, the electrode active material slurry discharged from the slot die coater is applied on a current collector transferred by a coating roll. A conventional slot die coater includes two die blocks and forms a slot between the two die blocks, and one type of electrode active material slurry may be discharged through one slot to form a one-layer electrode active material layer.

In order to manufacture a secondary battery having high energy density, the thickness of the electrode active material layer, which was about 130 μm, has been gradually increased to 300 μm. After a thick electrode active material layer is formed with a conventional slot die coater, migration of a binder and a conductive material in the active material slurry is intensified during drying, thereby non-uniformly manufacturing a final electrode. In an effort to solve this problem, when the electrode active material layer is coated twice, such as thinly applied, dried, and then applied again, there is a disadvantage in that it takes a long time. In order to simultaneously improve electrode performance and productivity, the inventors of the present application have proposed a dual slot die coater capable of simultaneously coating two types of electrode active material slurries as an upper layer and a lower layer.

FIG. 1 is a schematic cross-sectional view illustrating a dual slot die coater according to the prior art.

Referring to FIG. 1, two types of electrode active material slurries are discharged from the dual slot die coater 20 while the current collector 15 is driven by rotating the coating roll 10, so that the two-layer electrode active material layer may be formed at the same time on the current collector 15. The electrode active material slurry discharged from the dual slot die coater 20 is widely applied to one surface of the current collector 15 to form an electrode active material layer.

The dual slot die coater 20 is configured by assembling three plate members, that is, three die blocks 21, 22, 23. Slots are formed between adjacent die blocks, so two slots are formed. Since two types of electrode active material slurries are discharged at the same time through the outlets 24, 25 communicating with each slot, it is possible to simultaneously form the two-layer electrode active material layer by continuously applying an additional electrode active material slurry on the electrode active material layer formed by the electrode active material slurry applied first. Reference numerals 26, 27 represent manifolds in which the electrode active material slurry is accommodated.

When the full-width intermittent coating is performed using the dual slot die coater 20, an uncoated portion to which the electrode active material slurry is not applied is formed on the current collector 15. In this case, when air bubbles are present in the electrode active material slurry, the air bubbles are released from the outlets 24, 25 in a section where the uncoated portion is formed, and burst. At this time, a contamination phenomenon in which the electrode active material slurry surrounding the air bubbles is partially applied like a spot pattern to the uncoated portion occurs. In the electrode active material coating process, since the coating gap, which is a gap between the outlets 24, 25 and the current collector 15, is generally formed as a narrow gap of 100 μm to 200 μm, the above-described contamination phenomenon occurs even from small air bubbles.

The problem due to air bubbles is not unique to full-width intermittent coatings. When the electrode active material slurry is initially supplied and filled to the empty manifolds 26, 27, the electrode active material slurry pushes out the air remaining in the empty manifolds 26, 27 to fill the manifolds 26, 27. However, when the electrode active material slurry surrounds the air in a state where the air is not sufficiently discharged toward the outlets 24, 25 to remain in the manifolds 26, 27, air bubbles are formed in the electrode active material slurry. Since these bubbles may degrade the reproducibility of the coating process and may affect the agglomeration of the electrode active material slurry, it is necessary to supply the electrode active material slurry so as not to form the bubbles or provide a structure through which the already formed bubbles may escape.

Under these circumstances, there is a need for the development of a dual slot die coater having an improved structure to solve a problem caused by air bubbles in the electrode active material slurry.

DISCLOSURE

Technical Problem

The present disclosure is designed to solve the problems of the related art, and therefore the present disclosure is directed to providing a dual slot die coater capable of discharging a coating solution through an outlet after removing air bubbles contained in the coating solution.

However, technical problems to be solved by the present disclosure are not limited to the above-described problems, and other problems not mentioned herein may be clearly understood by one of ordinary skill in the art from the following description of the present disclosure.

Technical Solution

In one aspect of the present disclosure for solving the technical problem, there is provided a dual slot die coater having a lower slot and an upper slot and extruding and applying a coating solution through at least one of the lower slot and the upper slot to the surface of a continuously running substrate, including die blocks including a lower die block, a middle die block disposed at an upper portion of the lower die block to form the lower slot between the middle die block and the lower die block, and an upper die block disposed at an upper portion of the middle die block to form the upper slot between the upper die block and the middle die block; a lower manifold that accommodates a first coating solution as a recessed chamber provided in the lower die block or the middle die block and communicates with the lower slot, and an upper manifold that accommodates a second coating solution as a recessed chamber provided in the middle die block or the upper die block and communicates with the upper slot; and a lower air vent installed in the lower manifold region, and an upper air vent installed in the upper manifold region.

In another aspect of the present disclosure for solving the technical problem, there is provided a dual slot die coater having a lower slot and an upper slot and extruding and applying a coating solution through at least one of the lower slot and the upper slot to the surface of a continuously running substrate, including die blocks including a lower die block, a middle die block disposed at an upper portion of the lower die block to form the lower slot between the middle die block and the lower die block, and an upper die block disposed at an upper portion of the middle die block to form the upper slot between the upper die block and the middle die block; a lower manifold that accommodates a first coating solution as a recessed chamber provided in the lower die block or the middle die block and communicates with the lower slot, and an upper manifold that accommodates a second coating solution as a recessed chamber provided in the middle die block or the upper die block and communicates with the upper slot; and a lower air vent installed through at least one of the die blocks to communicate with the lower manifold, and an upper air vent installed through at least one of the die blocks to communicate with the upper manifold, wherein the lower air vent or the upper air vent includes a pipe having a hollow formed therein and a valve, wherein the pipe has a height of the highest point in a direction opposite to the direction of gravity equal to or less than the height of the valve.

In the dual slot die coaters according to the present disclosure, the lower air vent may be provided through the upper die block and the middle die block, and the upper air vent may be provided through the upper die block.

The lower air vent or the upper air vent may have a bent structure.

Each of the lower die block, the middle die block, and the upper die block includes a lower die lip, a middle die lip, and an upper die lip, which respectively forms the front end of each die block, wherein a lower outlet communicating with the lower slot is formed between the lower die lip and the middle die lip, and an upper outlet communicating with the upper slot is formed between the middle die lip and the upper die lip. The lower air vent may be installed adjacent to a front end of the lower manifold among the ends of the lower manifold without being installed at a lower land portion that is a portion where the front end placed on the lower outlet side and the lower outlet are connected, and the upper air vent may be formed adjacent to the front end of the upper manifold among the ends of the upper manifold without being installed at a upper land portion that is a portion where the front end placed on the upper outlet side and the upper outlet are connected.

According to anther embodiment, the lower air vent may be installed adjacent to a front end of the lower manifold among the ends of the lower manifold without being installed at a lower land portion that is a portion where the front end placed on the lower outlet side and the lower outlet are connected, and the upper air vent may be installed adjacent to a rear end of the upper manifold, which is placed opposite to the upper outlet, among the ends of the upper manifold.

In a preferred embodiment, the middle die block has a right-angled triangular shape in a cross-section along a direction in which the substrate travels, and the lower manifold is provided in the lower die block and the upper manifold is provided in the middle die block.

The lower manifold includes a first coating solution supply port communicating with the first coating solution supply chamber, and the upper manifold includes a second coating solution supply port communicating with the second coating solution supply chamber, wherein the first coating solution supply port is provided at the bottom of the lower die block, and the second coating solution supply port may be provided at the rear surface of the middle die block.

The dual slot die coater may further include a lower spacer interposed between the lower die block and the middle die block to adjust a width of the lower slot, and an upper spacer interposed between the middle die block and the upper die block to adjust a width of the upper slot.

Herein, the lower spacer and the upper spacer include an opening by cutting at least one region from the ends of the lower spacer and the upper spacer to determine the coating width of the coating layer applied on the substrate, and the lower air vent may be installed through the upper spacer.

The middle die block includes a first middle die block and a second middle die block that are in face-to-face contact with each other up and down and slide along the contact surface to be movable relative to each other, wherein the first middle die block may be fixedly coupled to the lower die block, and the second middle die block may be fixedly coupled to the upper die block.

Advantageous Effects

According to one aspect of the present disclosure, air bubbles contained in the coating solution may be removed before the coating solution is discharged through the outlet by the slot die coater including the air vent. Therefore, when used in the intermittent coating process of the electrode active material for applying the electrode active material slurry, it is possible to prevent the uncoated portion from being contaminated with the electrode active material slurry. Since it is possible to coat the electrode active material slurry from which air bubbles are removed, the reproducibility of the coating process is excellent, and the frequency of side effects such as agglomeration of the electrode active material slurry is reduced.

Since the air vent is configured in the flow path, positioning is important. In another aspect of the present disclosure, the air vent is positioned in the manifold region rather than the land portion, thereby minimizing interference in the flow path due to the air vent configuration. Therefore, in addition to the bubble removal by the air vent function, it may be accompanied by the effect of minimizing the loading deviation in the width direction.

The air vent provides a passage through which air in the manifold and air in the air bubbles contained in the coating solution included in the manifold may escape to the outside. If the air is not smoothly discharged from the air vent and becomes a trap, the effect of the air vent is degraded. According to another aspect of the present disclosure, it is possible to prevent air from being trapped in the pipe by making the height of the valve the highest in the pipe with the valve included in the air vent.

According to the present disclosure, it is possible to effectively remove air bubbles contained in the coating solution and at the same time, uniformly form a coating layer, particularly an electrode active material layer, and two types of electrode active material slurries may be simultaneously coated, whereby both performance and productivity are excellent. When the dual slot die coater of the present disclosure is used to manufacture an electrode or the like of a secondary battery by coating an electrode active material slurry on a current collector, there is an advantage that uniform coating may be performed even under high-speed or long-width application conditions.

According to still another aspect of the present disclosure, there is also an effect of improving the processability of the dual slot coating by means of easily adjusting the positions of the upper and lower outlets by relatively moving the upper and lower die blocks according to the coating process conditions.

DESCRIPTION OF DRAWINGS

The accompanying drawings illustrate a preferred embodiment of the present disclosure and together with the foregoing disclosure, serve to provide further understanding of the technical features of the present disclosure, and thus the present disclosure is not construed as being limited to the drawings.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

The dual slot die coater of the present disclosure is an apparatus that includes a lower slot and an upper slot and coats a coating solution in a double layer on a substrate. As used herein, the 'substrate' refers to a current collector, and the 'coating solution' refers to an electrode active material slurry. Both the first coating solution and the second coating solution are electrode active material slurries, and may mean electrode active material slurries having the same or different composition (type of active material, conductive material, and binder), content (amount of active material, conductive material, and binder) or physical properties. The dual slot die coater of the present disclosure is optimized for electrode manufacturing in which two types of electrode active material slurries are applied simultaneously or are applied alternately to be pattern-coated. However, the scope of the present disclosure is not necessarily limited thereto. For example, the substrate may be a porous support constituting a separator, and the first coating solution and the second coating solution may be organic materials having different compositions or physical properties. That is, if thin film coating is required, anything may be used for the substrate, the first coating solution, and the second coating solution.

Figure 1:
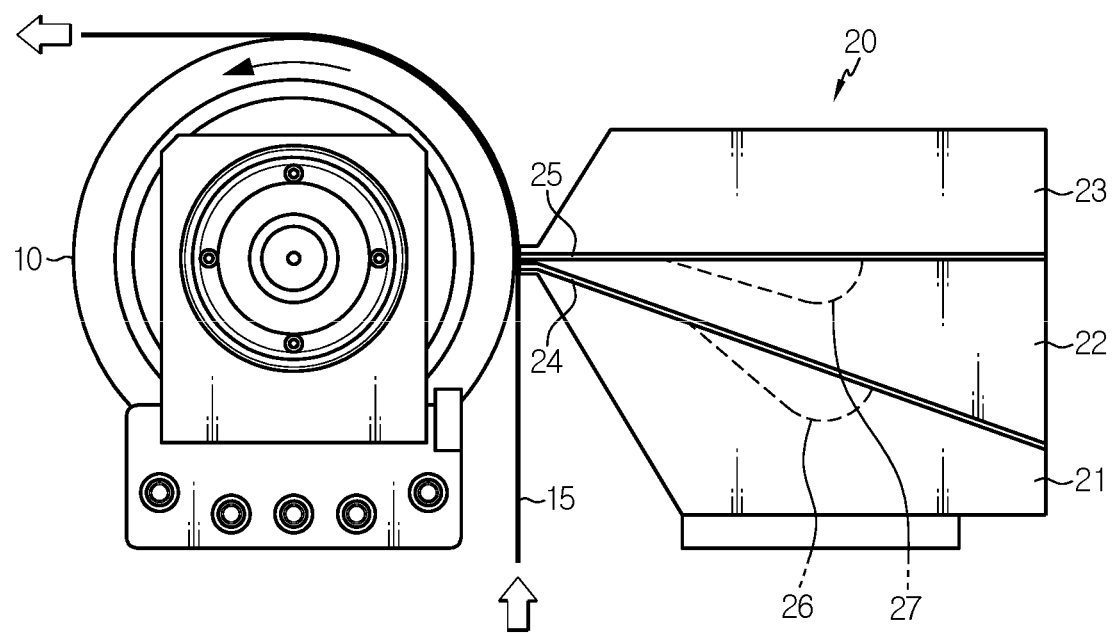
FIG. 1 is a schematic cross-sectional view illustrating a dual slot die coater according to the prior art.
Figure 2:
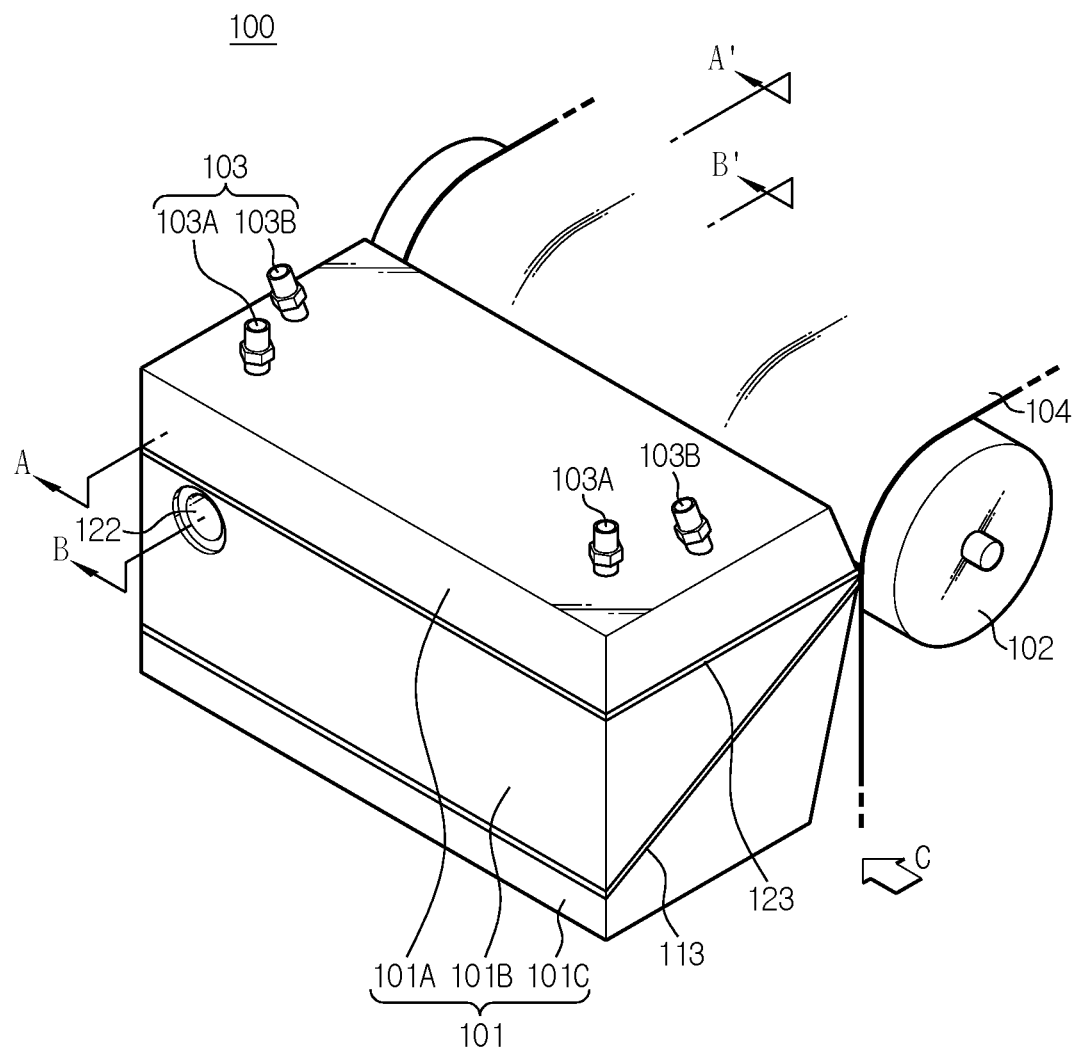
FIG. 2 is a schematic diagram illustrating a slot die coater according to a first embodiment of the present disclosure.
Figure 3:
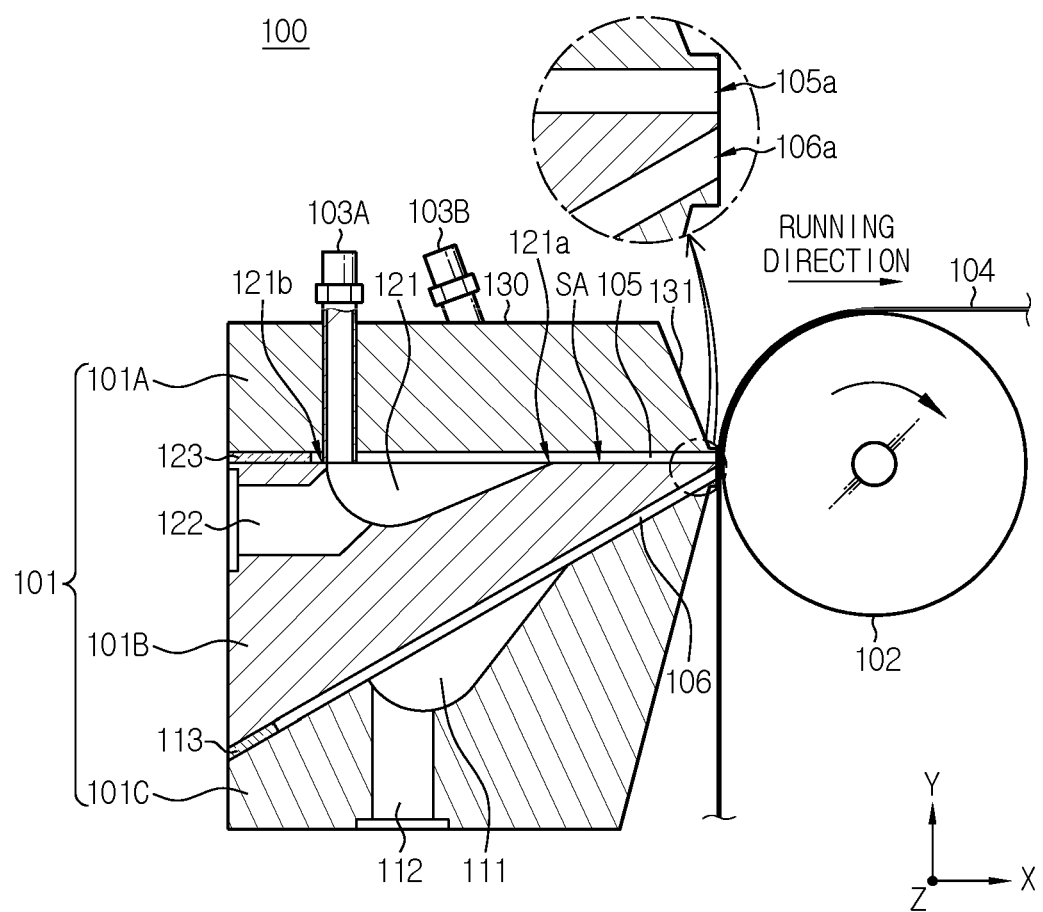
FIG. 3 is a vertical cross-sectional view taken along the line B-B' of FIG. 2 when viewed from the direction C.
Figure 4:
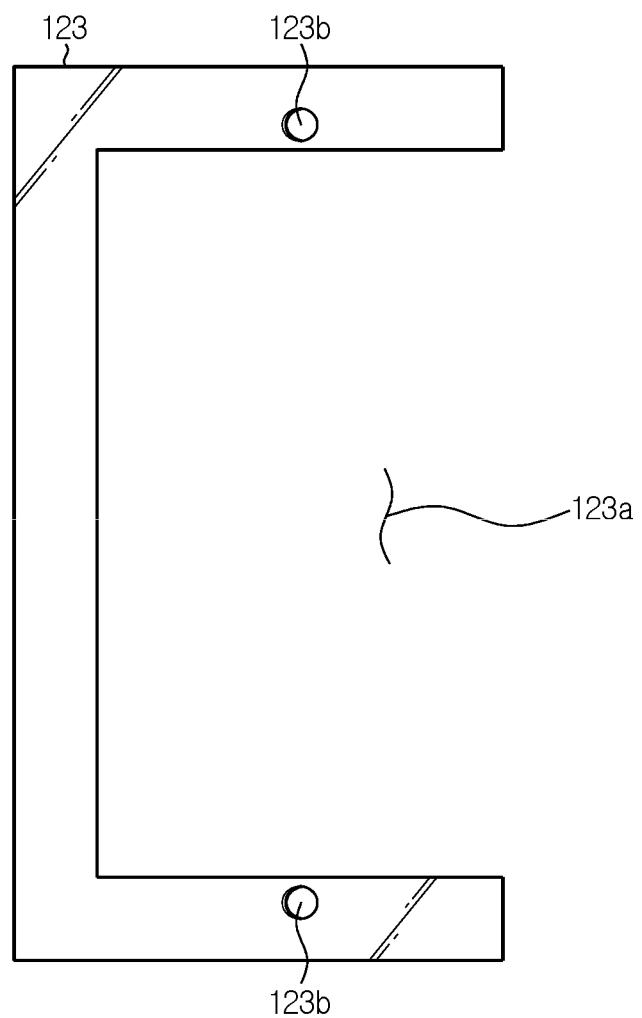
FIG. 4 is a plan view illustrating the upper spacer of FIG. 3.
Figure 5:
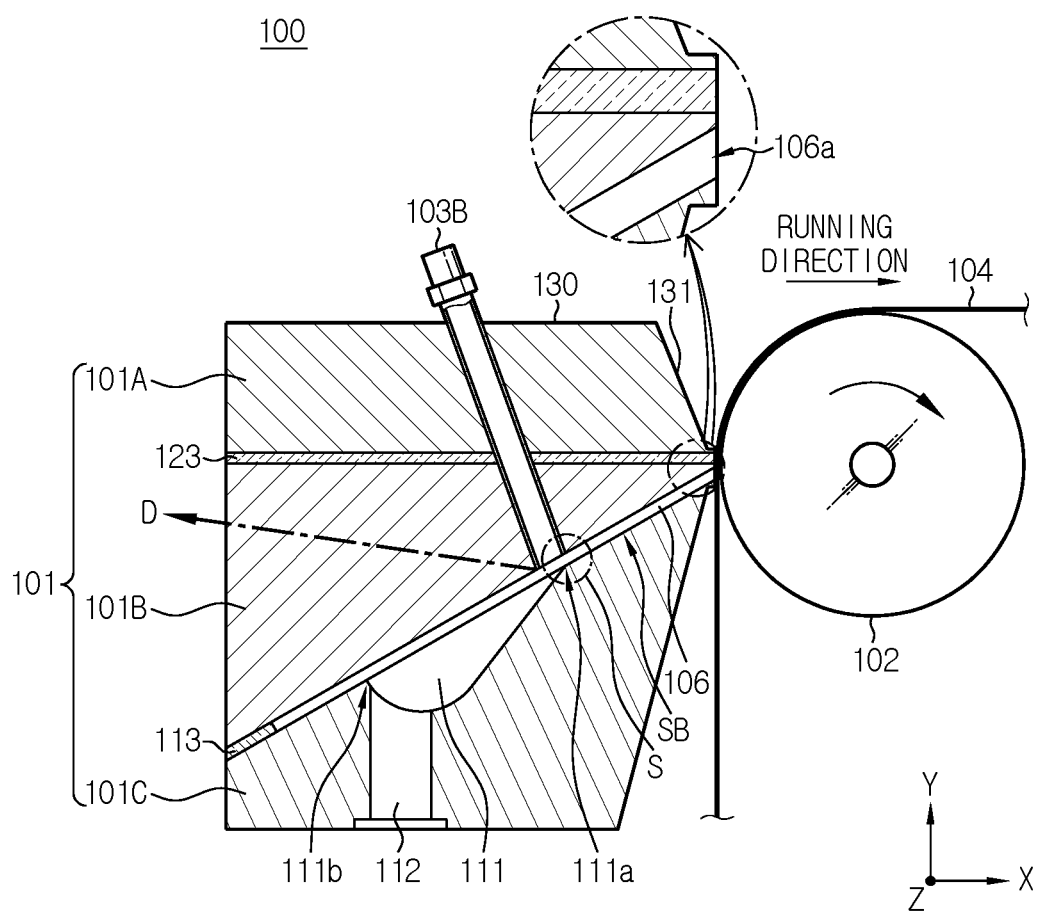
FIG. 5 is a vertical cross-sectional view taken along the line A-A' of FIG. 2 when viewed from the direction C.
Figure 6:
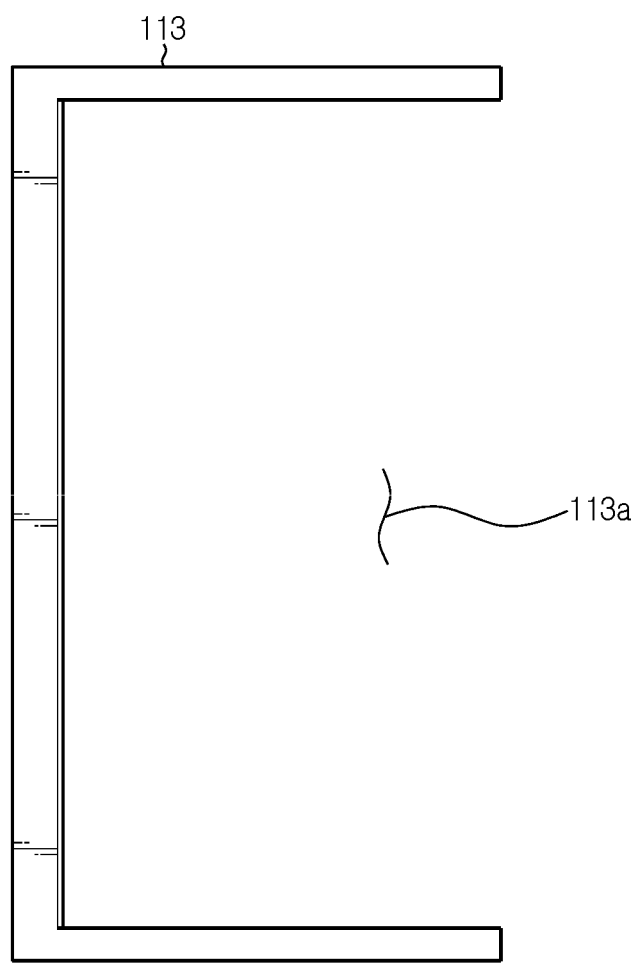
FIG. 6 is a plan view illustrating the lower spacer of FIG. 5.
Figure 7:
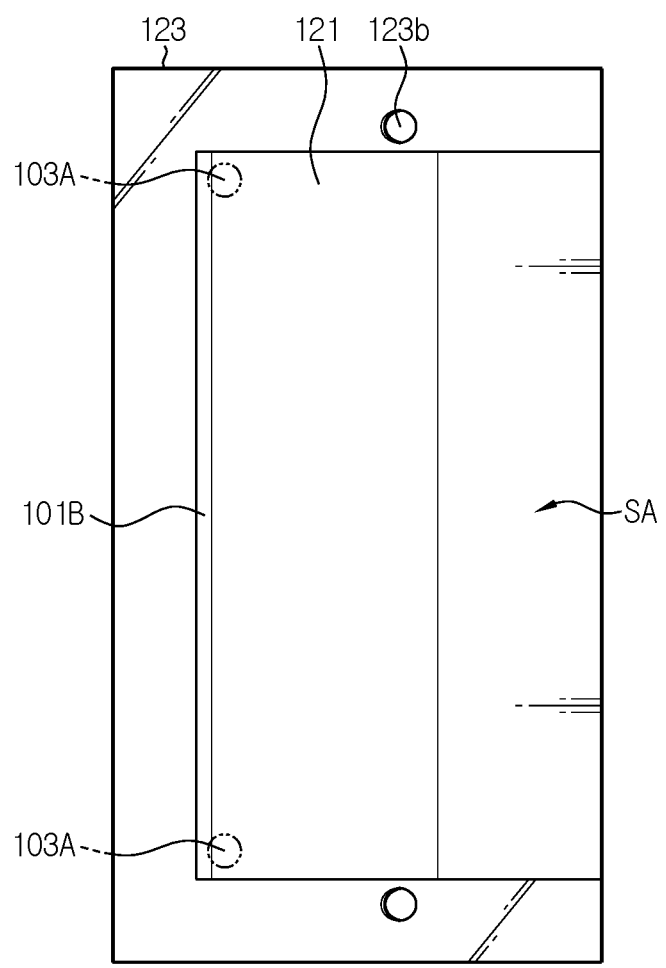
FIG. 7 is a plan view illustrating that an upper spacer is positioned on a middle die block.
Figure 8:
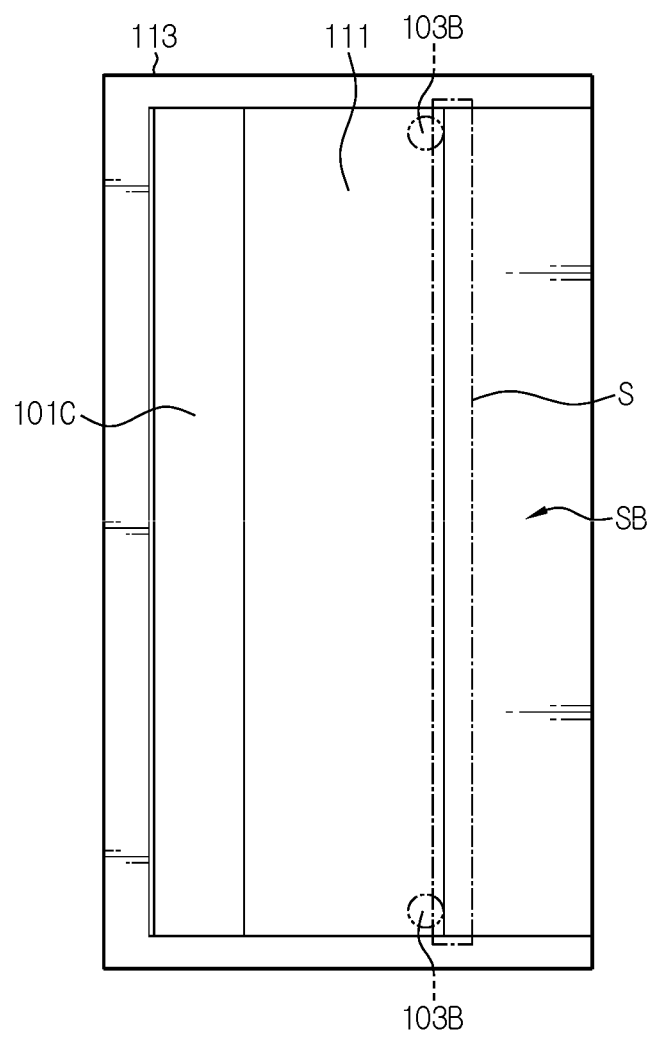
FIG. 8 is a plan view illustrating that a lower spacer is positioned on a lower die block.
Figure 9:
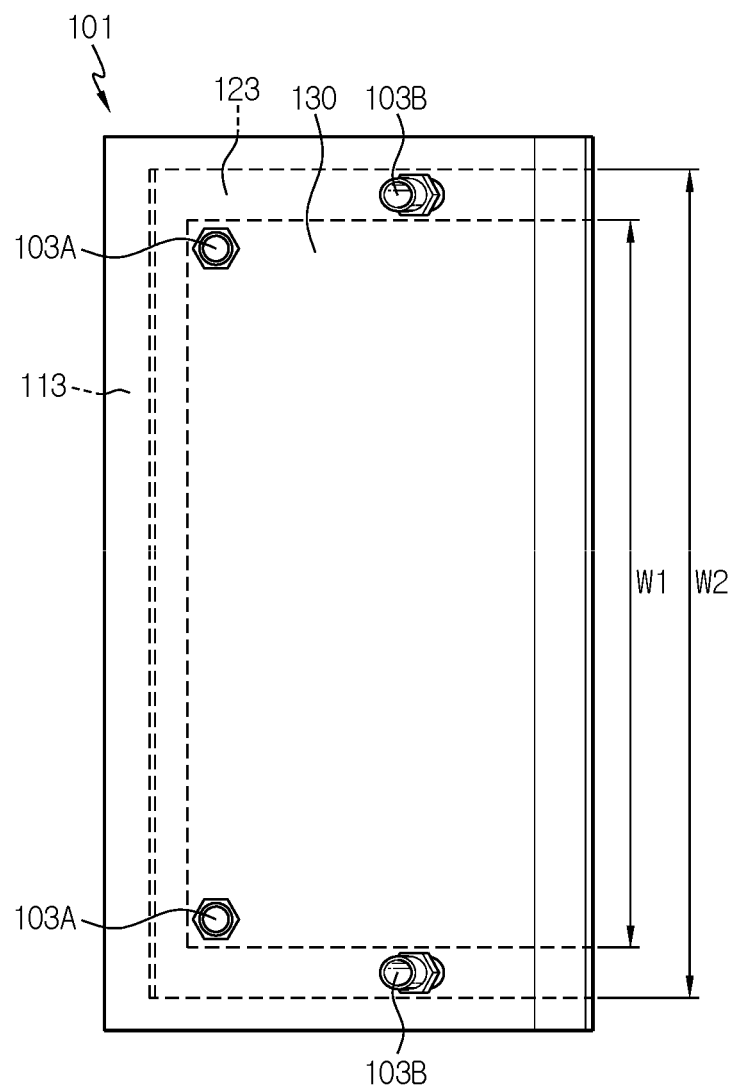
FIG. 9 is a plan view illustrating the slot die coater of FIG. 2.

FIG. 2 is a schematic diagram illustrating a slot die coater according to a first embodiment of the present disclosure. FIG. 3 is a vertical cross-sectional view taken along the line B-B' of FIG. 2 when viewed from the direction C. FIG. 4 is a plan view illustrating the upper spacer of FIG. 3. FIG. 5 is a vertical cross-sectional view taken along the line A-A' of FIG. 2 when viewed from the direction C. FIG. 6 is a plan view illustrating the lower spacer of FIG. 5. FIG. 7 is a plan view illustrating that an upper spacer is positioned on a middle die block. FIG. 8 is a plan view illustrating that a lower spacer is positioned on a lower die block. FIG. 9 is a plan view illustrating the slot die coater of FIG. 2.

The dual slot die coater 100 according to the present disclosure is an apparatus for extruding and applying the coating solution on the surface of the substrate 104 that runs continuously through at least one of the lower slot 106 and the upper slot 105. The dual slot die coater 100 includes a lower slot 106 and an upper slot 105, and may coat simultaneously or alternately the same or different two types of coating solutions on the substrate 104 through the lower slot 106 and the upper slot 105.

First, referring to FIGS. 2 and 3, the dual slot die coater 100 includes a lower die block 101C, a middle die block 101B disposed on top of (or adjacent to) the lower die block 101C, and an upper die block 101A disposed on top of (or adjacent to) the middle die block 101B. The die blocks 101A, 101B, 101C may be assembled with each other through bolts (not shown) as fastening members to form the slot die 101. In particular, the dual slot die coater 100 of the present disclosure is characterized by including an air vent 103.

In FIG. 3, the dual slot die coater 100 is installed almost horizontally in the direction (X direction) in which the electrode active material slurry as the coating solution is discharged (almost or approximately: ±5 degrees).

The middle die block 101B is a block located in the middle of the blocks constituting the dual slot die coater 100, and is disposed between the lower die block 101C and the upper die block 101A to form a double slot. The middle die block 101B of the present embodiment has a cross-section with a right-angled triangle shape along the direction in which the substrate 104 runs, but this shape is not necessarily limited thereto, and for example, the cross-section may be provided in an isosceles triangle.

A surface where the middle die block 101B faces the upper die block 101A is placed almost horizontally, and an opposite surface of the surface facing the above surface in the upper die block 101A (i.e., an upper surface forming the upper surface of the outer peripheral surface of the dual slot die coater 100) is also placed almost horizontally. Also, an opposite surface of the surface where the lower die block 101C faces the middle die block 101B is placed almost horizontally, and this surface becomes the bottom surface (X-Z plane). In the lower die block 101C, the middle die block 101B, and the upper die block 101A, a surface opposite to the direction in which the electrode active material slurry is discharged, that is, a rear surface is disposed in a substantially vertical direction (Y direction).

Among the surfaces forming the outer peripheral surface of the dual slot die coater 100 in the lower die block 101C and the upper die block 101A, which are the outermost die blocks, the bottom surface of the lower die block 101C and an upper surface of the upper die block 101A may be manufactured to be almost perpendicular to the rear surface. An upper surface of the upper die block 101A may be divided into two regions. The upper surface of the upper die block 101A may include a flat portion 130 positioned relatively far from the upper outlet 105a and an inclined portion 131 extending from the flat portion 130. The flat portion 130 extends in a direction parallel to the bottom surface (X-Z plane), and the inclined portion 131 may form an angle of approximately 30 to 60 degrees with the flat portion 130 and may have a downwardly inclined shape. The surface facing the upper die block 101A in the middle die block 101B may be a surface manufactured to be substantially perpendicular to the rear surface.

In these die blocks 101A, 101B, 101C, since the edges formed by the surfaces are formed at right angles, there is a right angle portion in the cross-section, and since a vertical or horizontal surface may be used as a reference surface, it is easy to manufacture or handle, and precision is guaranteed. In addition, the state in which the lower die block 101C, the middle die block 101B, and the upper die block 101A are combined has an approximately rectangular parallelepiped shape as a whole, and only the front portion from which the coating solution is discharged is inclined toward the substrate 104. This is advantageous in that the shape after assembly is substantially similar to that of a slot die coater having a single slot, thereby sharing a slot die coater pedestal and the like.

The lower die block 101C, the middle die block 101B, and the upper die block 101A are not necessarily limited to the above-exemplified form, and for example, may also be configured as a vertical die in which the discharge direction of the electrode active material slurry is facing up and the rear surface is the bottom surface.

The die blocks 101A, 101B, 101C are made of a metal material, for example, SUS material. A material that is easy to process, such as SUS420J2, SUS630, SUS440C, SUS304, SUS316L, and the like may be used. SUS is advantageous in that it is easy to process, is inexpensive, has high corrosion resistance, and may be manufactured into a desired shape at low cost.

The lower die block 101C is a block located at the bottom of the blocks constituting the dual slot die coater 100, and has an inclined shape to form an angle of approximately 20 to 60 degrees with respect to a horizontal surface (X-Z plane) having a surface facing the middle die block 101B as a bottom surface.

Referring to FIG. 3, a lower slot 106 may be formed between a place or surface where the lower die block 101C and the middle die block 101B face each other. For example, a lower spacer 113 is interposed between the lower die block 101C and the middle die block 101B to provide a gap therebetween, so that the lower slot 106 corresponding to a passage through which the first coating solution flows may be formed. In this case, the thickness of the lower spacer 113 determines the vertical width (Y-axis direction, slot gap) of the lower slot 106.

The lower spacer 113 includes a first opening 113a by cutting at least one region from the end to determine the coating width of the coating layer applied on the substrate 104 (refer to FIG. 6), and may be interposed at the remaining portion except for one side of the edge region of the opposing surfaces of each of the lower die block 101C and the middle die block 101B. For example, the lower spacer 113 may have a planar shape of approximately "=". Accordingly, the lower outlet 106a through which the first coating solution may be discharged to the outside is formed only between the front end of the lower die block 101C and the front end of the middle die block 101B. The front end of the lower die block 101C and the front end of the middle die block 101B are defined as a lower die lip and a middle die lip, respectively, and in other words, the lower outlet 106a may be formed by being spaced apart between the lower die lip and the middle die lip.

For reference, it is preferable that the lower spacer 113 is made of a material having sealing properties as it functions as a gasket that prevents the first coating solution from leaking into a gap between the lower die block 101C and the middle die block 101B, except for the region where the lower outlet 106a is formed.

The lower die block 101C includes a lower manifold 111 having a predetermined depth on a surface facing the middle die block 101B and communicating with the lower slot 106. In this embodiment, the lower manifold 111 is a recessed chamber provided in the lower die block 101C, and accommodates the first coating solution. In another embodiment, the lower manifold 111 may be provided in the middle die block 101B.

Although not shown in the drawings, the lower manifold 111 may be connected to a first coating solution supply chamber (not shown) installed outside through a supply pipe to continuously receive the first coating solution. When the first coating solution is filled in the lower manifold 111, the first coating solution is guided to flow along the lower slot 106 and is discharged to the outside through the lower outlet 106a. The lower manifold 111 includes a first coating solution supply port 112 communicating with the first coating solution supply chamber (not shown), and the first coating solution supply port 112 may be provided at the bottom of the lower die block 101C.

The upper die block 101A is disposed to face the upper surface of the middle die block 101B parallel to the horizontal plane. The upper slot 105 is formed between the middle die block 101B and the upper die block 101A facing each other. In the example shown in FIG. 3, a contact surface between the lower die block 101C and the middle die block 101B is inclined with respect to the horizontal plane.

Like the lower slot 106 described above, an upper spacer 123 may be interposed between the middle die block 101B and the upper die block 101A to provide a gap therebetween. Accordingly, an upper slot 105 corresponding to a passage through which the second coating solution may flow is formed. In this case, the vertical width (Y-axis direction, slot gap) of the upper slot 105 is determined by the upper spacer 123.

In addition, the upper spacer 123 has a structure similar to the lower spacer 113 described above. The upper spacer 123 includes a second opening 123a by cutting at least one region from the end to determine the coating width of the coating layer applied on the substrate 104 (refer to FIG. 4), and may be interposed at the remaining portion except for one side of the edge region of the opposing surfaces of each of the middle die block 101B and the upper die block 101A. For example, the upper spacer 123 may have a planar shape of approximately "=". Like the lower spacer 113, the circumferential direction except for the front of the upper slot 105 is blocked, and the upper outlet 105a is formed only between the front end of the middle die block 101B and the front end of the upper die block 101A. The front end of the upper die block 101A is defined as an upper die lip, and in other words, the upper outlet 105a may be formed by being spaced apart between the middle die lip and the upper die lip.

Referring further to FIG. 4, a through-hole 123b through which the lower air vent 103B passes is formed in the upper spacer 123. A detailed description of the lower air vent 103B will be described later.

As shown in FIG. 3, the middle die block 101B includes an upper manifold 121 having a predetermined depth on a surface facing the upper die block 101A and communicating with the upper slot 105. In this embodiment, the upper manifold 121 is a recessed chamber provided in the middle die block 101B, and accommodates the second coating solution. In another embodiment, the upper manifold 121 may be provided in the upper die block 101A.

Although not shown in the drawings, the upper manifold 121 may be connected to a second coating solution supply chamber installed outside through a supply pipe to continuously receive the second coating solution. When the second coating solution is supplied from the outside along the pipe-shaped supply pipe and filled in the upper manifold 121, the second coating solution is guided to flow along the upper slot 105 communicating with the upper manifold 121 and is discharged to the outside through the upper outlet 105a. The upper manifold 121 includes a second coating solution supply port 122 communicating with the second coating solution supply chamber (not shown), and the second coating solution supply port 122 may be provided at the rear surface of the middle die block 101B.

The upper slot 105 and the lower slot 106 form a predetermined angle, and the angle may be approximately 30 degrees to 70 degrees. The upper slot 105 and the lower slot 106 intersect each other in one place, and the upper outlet 105a and the lower outlet 106a may be provided near the intersection point. Accordingly, the discharge points of the first coating solution and the second coating solution may be concentrated in approximately one place.

According to the dual slot die coater 100 having such a configuration, a coating roll 102 is rotatably coupled and disposed in front of the slot die 101, and while running the substrate 104 to be coated by rotating the coating roll 102, the first coating solution and the second coating solution are continuously brought into contact with the surface of the substrate 104, thereby coating the substrate 104 in a double layer. Alternatively, the supply and interruption of the first coating solution and the supply and interruption of the second coating solution may be alternately carried out to form a pattern coating intermittently on the substrate 104. In particular, the dual slot die coater 100 of the present disclosure further includes an air vent 103. Referring to FIGS. 2, 3 and 5, the air vent 103 includes an upper air vent 103A and a lower air vent 103B. The upper air vent 103A penetrates the upper die block 101A to communicate with the upper manifold 121, and is particularly installed in the upper manifold 121. Accordingly, air bubbles contained in the electrode active material slurry in the upper manifold 121 may be removed through the upper air vent 103A. The electrode active material slurry is discharged onto the substrate 104 through the upper outlet 105a after air bubbles are removed as described above. The upper air vent 103A may be installed by simply making a hole in the upper die block 101A. Alternatively, the upper air vent 103A may be installed by inserting a hollow pipe into the hole. In the drawing, the upper air vent 103A using a pipe is illustrated.

The upper air vent 103A provides a passage through which air in the upper manifold 121 and air in the air bubbles contained in the electrode active material slurry may escape to the outside. Since the upper outlet 105a is formed in a direction parallel to the ground, the air bubble contained in the electrode active material slurry may be easily released to the outside through the upper air vent 103A no matter where the upper air vent 103A communicates with the upper manifold 121. However, in order to efficiently remove air bubbles contained in the electrode active material slurry, the upper air vent 103A is preferably installed in a direction perpendicular to the discharge direction of the electrode active material slurry and opposite to the direction of gravity.

In particular, since the upper air vent 103A is configured in the flow path through which the second coating solution flows, positioning is important. In the present disclosure, the upper air vent 103A is installed in the upper manifold 121 so as to minimize interference in the flow path. That is, it is installed in another region outside the upper manifold 121, thereby not interfering with the flow of the second coating solution. Installation in the upper manifold 121 means that it is not installed in the upper land portion SA, which is a portion where the front end 121a placed at the upper outlet 105a among the ends of the upper manifold 121 and the upper outlet 105a are connected. In the present embodiment, the upper air vent 103A is installed adjacent to the rear end 121b placed opposite to the upper outlet 105a among the ends of the upper manifold 121.

FIG. 7 is a plan view illustrating that an upper spacer is positioned on a middle die block. For convenience of description, the position of the upper air vent 103A is indicated.

Referring to FIGS. 3 and 7, the upper air vents 103A may be respectively formed at the rear side portions in the region formed in the upper manifold 121 in the second opening 123a of the upper spacer 123 when the middle die block 101B is viewed from above. Here, "rear" means a direction opposite to the direction where the second electrode active material slurry, which is the second coating solution, is discharged. Also, "side" refers to both sides in the longitudinal direction of the middle die block 101B and perpendicular to the direction in which the second active material slurry is discharged. Through this structure, there is an advantage in that the position of the upper air vent 103A does not interfere with the movement of an operator and facilitates maintenance and repair of the dual slot die coater 100.

Referring to FIG. 5, the lower air vent 103B penetrates the upper die block 101A and the middle die block 101B to communicate with the lower manifold 111. Therefore, before the first electrode active material slurry, which is the first coating solution in the lower manifold 111, is discharged to the lower outlet 106a, air bubbles contained in the second electrode active material slurry may be removed through the lower air vent 103B.

The lower air vent 103B may be installed by simply making holes in the upper die block 101A and the middle die block 101B. Alternatively, the lower air vent 103B may be installed by inserting a hollow pipe into the hole. In the drawing, the lower air vent 103B using a pipe is illustrated.

The lower air vent 103B provides a passage through which air in the lower manifold 111 and air in the air bubbles contained in the first electrode active material slurry may escape to the outside. Since the lower air vent 103B is configured in the flow path through which the first coating solution flows, positioning is important. In the present disclosure, the lower air vent 103B is installed in the lower manifold 111 so as to minimize interference in the flow path. That is, it is installed in another region outside the lower manifold 111, thereby not interfering with the flow of the first coating solution. Installation in the lower manifold 111 means that it is not installed in the lower land portion SB, which is a portion where the front end 111a placed at the lower outlet 106a among the ends of the lower manifold 111 and the lower outlet 106a are connected.

Since the lower outlet 106a is inclined at an angle of 30 to 60 degrees with respect to the ground, and the first electrode active material slurry is supplied from the lower slurry supply port 112 to the lower manifold 111 in a direction opposite to the direction of gravity, the largest amount of air bubbles is generated at a S portion connected from the lower manifold 111 to the lower outlet 106a. Therefore, it is preferable that the lower air vent 103B is installed adjacent to the S portion.

The S portion is a region between the front end 111a of the lower manifold 111 and the lower land portion SB. Accordingly, the lower air vent 103B is installed adjacent to the S portion, but should not be installed in the lower land portion SB. Therefore, preferably, the lower air vent 103B is installed adjacent to the front end 111a of the lower manifold 111 among the ends of the lower manifold 111. In addition, in consideration of the inclined structure of the lower outlet 106a, it is preferable to maintain an angle between the lower air vent 103B and the lower outlet 106a at about 80 degrees to about 150 degrees.

FIG. 8 is a plan view illustrating that a lower spacer is positioned on a lower die block. For convenience of description, the position of the lower air vent 103B is indicated. FIG. 9 is a plan view illustrating the slot die coater of FIG. 2.

Referring to FIGS. 5, 8 and 9, the lower air vent 103B is preferably installed so as not to penetrate the upper outlet 105a and the upper manifold 121. If the lower air vent 103B penetrates a portion where the upper outlet 105a and the upper manifold 121 are formed, it may interfere with the flow of the second electrode active material slurry and air bubbles may be formed at the through portion. Therefore, it is preferable that the lower air vent 103B is formed through a position outside the second opening 123a of the upper spacer 123. For example, the length W1 of the second opening 123a of the upper spacer 123 is smaller than the length W2 of the first opening 113a of the lower spacer 113, so that the lower air vent 103B may be formed to penetrate the through-hole 123b of the upper spacer 123.

The lower air vents 103B may be respectively formed at portions close to the side surface of the upper die block 101A in the longitudinal direction of the upper die block 101A perpendicular to a direction in which the first electrode active material slurry is discharged. The position of the lower air vent 103B has the advantage of facilitating maintenance and repair of the dual slot die coater 100 without interfering with the movement of an operator.

In addition to the embodiment shown in FIG. 5, the lower air vent 103B may be formed in various directions. For example, the lower air vent 103B may be formed in a rearward direction penetrating the middle die block 101B (see D of FIG. 5).

In this case, since the lower air vent 103B does not penetrate the upper spacer 123, there is an advantage that it may be installed at various positions in the lateral direction. Also, the lower air vent 103B may be formed in a lateral direction.

Figure 10:
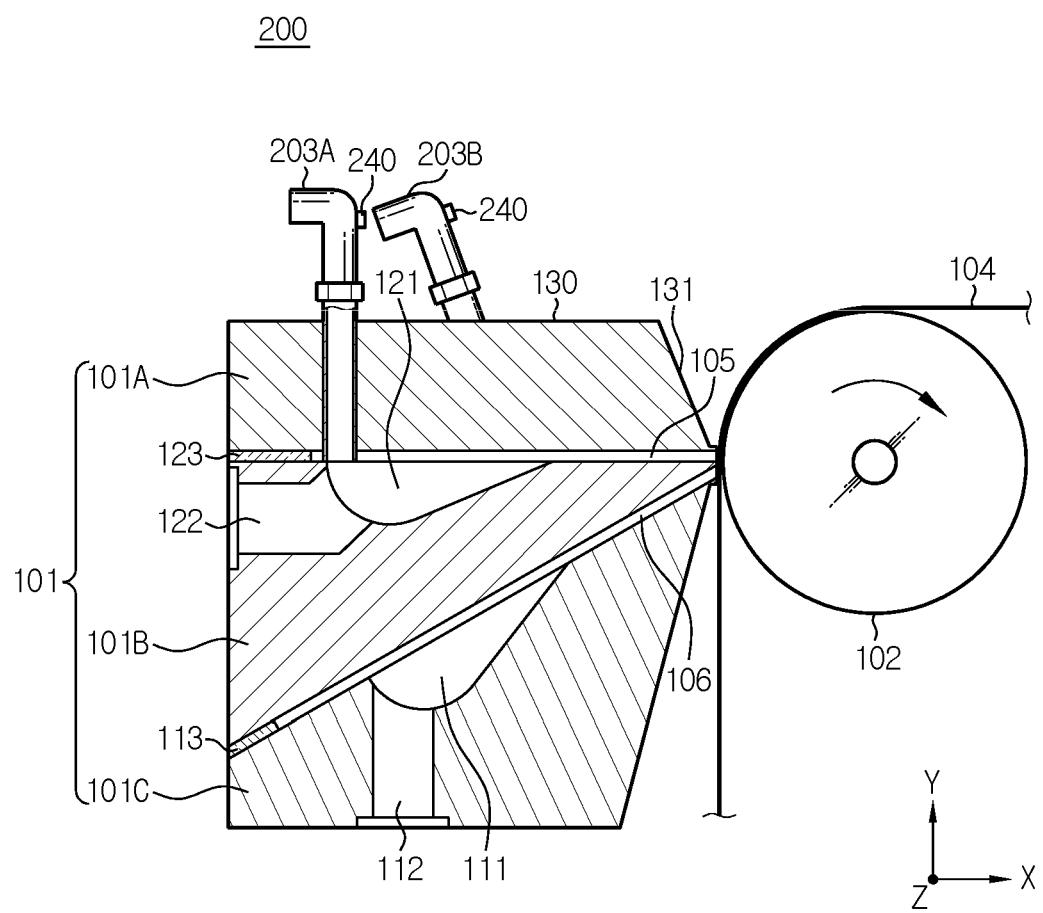
FIG. 10 is a vertical cross-sectional view illustrating a modified example of FIG. 3.

FIG. 10 is a vertical cross-sectional view illustrating a modified example of FIG. 3.

Referring to FIGS. 3 and 10, the dual slot die coater 200 may have a structure in which the upper air vent 203A is bent in a "7" shape. When removing air bubbles contained in the electrode active material slurry having low viscosity, the air bubbles may be discharged together with the electrode active material slurry. At this time, the operator may easily receive the electrode active material slurry flowing down through the bent upper air vent 203A. Although only a structure bent in a "7" shape is shown in FIG. 10, the upper air vent 203A may be bent in various shapes as long as it may easily receive the flowing electrode active material slurry.

In addition, the upper air vent 203A may include a valve 240. The valve 240 is not particularly limited as long as it has a structure capable of opening and closing a hollow pipe.

The dual slot die coater 200 may have the same structure as the dual slot die coater 100 of FIG. 3, except that the upper air vent 203A is bent in a "7" shape and has a structure including the valve 240. Accordingly, descriptions of other configurations will be omitted.

Figure 11:
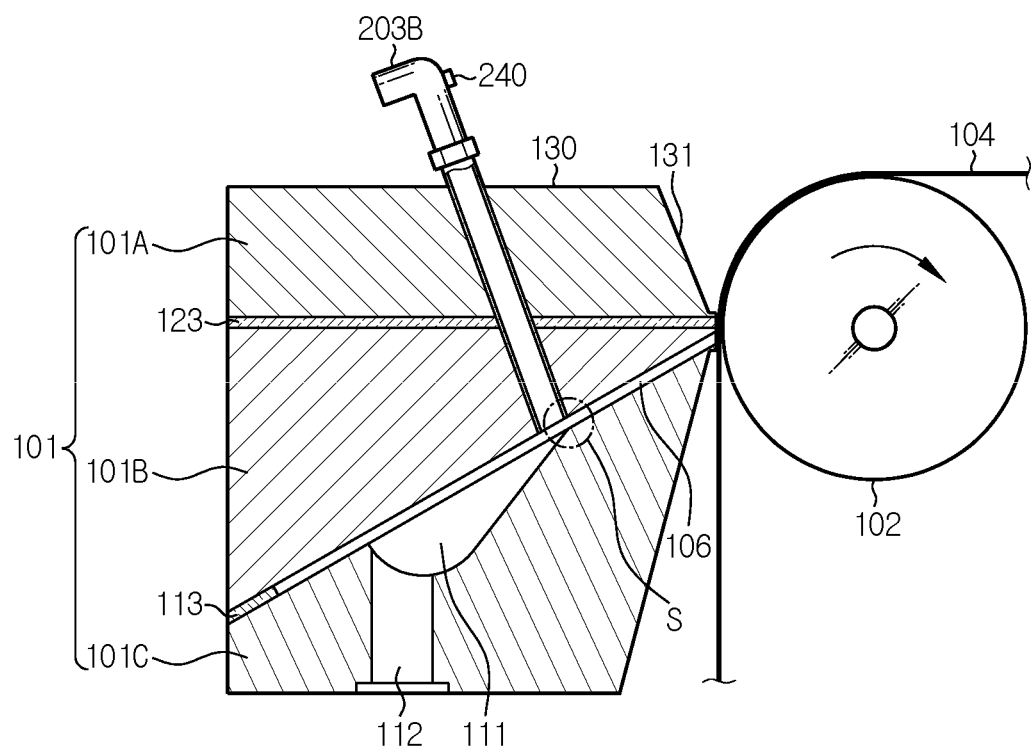
FIG. 11 is a vertical cross-sectional view illustrating a modified example of FIG. 5.

FIG. 11 is a vertical cross-sectional view illustrating a modified example of FIG. 5.

Referring to FIGS. 5 and 11, the dual slot die coater 200 may have a structure in which the lower air vent 203B is bent in a "7" shape. When removing air bubbles contained in the electrode active material slurry having low viscosity, the air bubbles are discharged together with the electrode active material slurry. At this time, the operator may easily receive the second electrode active material slurry flowing down through the bent upper air vent 203B. Although only a structure bent in a "," shape is shown in FIG. 11, the lower air vent 203B may be bent in various shapes as long as it may easily receive the flowing electrode active material slurry.

In addition, the lower air vent 203B may include a valve 240. The valve 240 is not particularly limited as long as it has a structure capable of opening and closing a hollow pipe.

The dual slot die coater 200 may have the same structure as the dual slot die coater 100 of FIG. 7, except that the lower air vent 203B is bent in a "7" shape and has a structure including the valve 240. Accordingly, descriptions of other configurations will be omitted.

The installation structure of the air vents 103, 203A, 203B according to the present disclosure may be applied to a single slot coater having one slot. In this case, it may be formed like the upper air vent 103A of FIG. 3. Since the related structure has already been described above, it will be omitted here.

According to the present disclosure described above, air bubbles contained in the coating solution may be removed before the coating solution is discharged through the outlet by the dual slot die coaters 100, 200 including the air vent. Therefore, when used in the intermittent coating process of the electrode active material for applying the electrode active material slurry, it is possible to prevent the uncoated portion from being contaminated with the electrode active material slurry. Since it is possible to coat the electrode active material slurry from which air bubbles are removed, the reproducibility of the coating process is excellent, and the frequency of side effects such as agglomeration of the electrode active material slurry is reduced.

Since the air vent is configured in the flow path, positioning is important. In the present disclosure, the air vent is positioned in the manifold region rather than the land portion, thereby minimizing interference in the flow path due to the air vent configuration. Therefore, in addition to the bubble removal by the air vent function, it may be accompanied by the effect of minimizing the loading deviation in the width direction.

According to the present disclosure, it is possible to effectively remove air bubbles contained in the coating solution and at the same time, uniformly form a coating layer, particularly an electrode active material layer, and two types of electrode active material slurries may be simultaneously coated, whereby both performance and productivity are excellent. When the dual slot die coater of the present disclosure is used to manufacture an electrode or the like of a secondary battery by coating an electrode active material slurry on a current collector, there is an advantage that uniform coating may be performed even under high-speed or long-width application conditions.

In addition, the dual slot die coaters 100, 200 according to the present disclosure may prevent contamination of the uncoated portion that occurs during intermittent coating, and may also solve a problem of non-coating of the active material that occurs in continuous coating. In the continuous coating process, when air bubbles surrounded by the slurry burst at the time of applying the electrode active material slurry containing the air bubbles to the electrode, a portion in which the active material is not coated, such as a crater, occurs in the place where the air bubbles were. In the dual slot die coaters 100, 200 according to the present disclosure, the air bubbles contained in the electrode active material slurry are removed through the air vents 103, 203A, 203B before the electrode active material slurry is discharged to the outlets 105a, 106a, so that the above problem of non-coating of the active material may be solved.

Meanwhile, in this embodiment, although a case of applying the coating solution in two layers or a case of pattern coating by supplying the coating solution alternately has been described as an example, it may be understood without separate explanation that it is applicable even when two types of coating solutions are joined in the middle of a slot rather than being discharged through individual slots, or when three or more slots are provided and then three or more layers are simultaneously applied.

Figure 12:
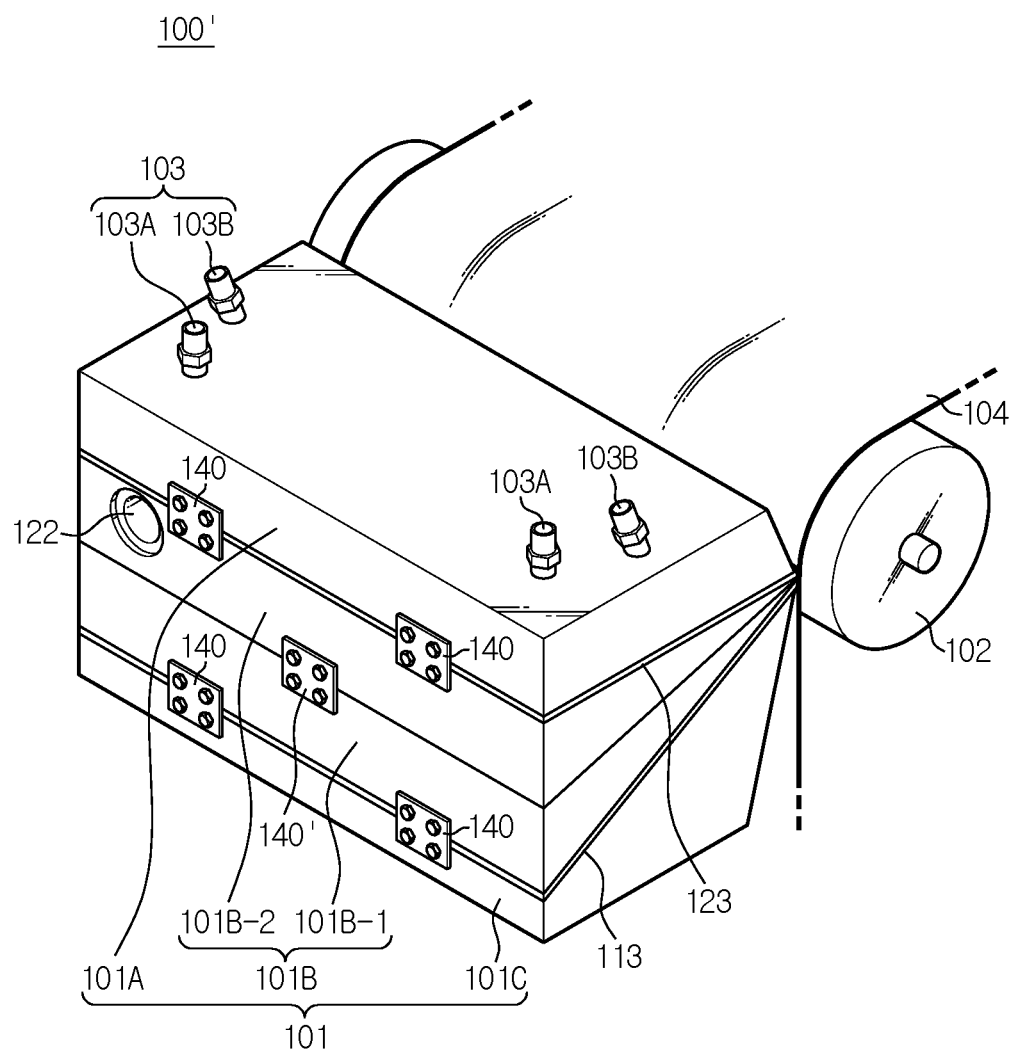
FIG. 12 is a schematic diagram illustrating a slot die coater according to a second embodiment of the present disclosure as a modified example of FIG. 2.

Next, a second embodiment of the present disclosure will be described with reference to FIG. 12. The same reference numerals as in the first embodiment described above represent the same members, so repeated descriptions of the same members will be omitted, and differences from the above-described first embodiment will be mainly described.

In the first embodiment described above, since the middle die block 101B is formed of one block, the relative positions of the upper outlet 105a and the lower outlet 106a may not be variably adjusted. However, according to the second embodiment of the present disclosure, the relative positions of the upper outlet 105a and the lower outlet 106a may be easily adjusted.

To this end, in the dual slot die coater 100' according to the second embodiment of the present disclosure, the middle die block 101B includes a first middle die block 101B-1 and a second middle die block 101B-2, wherein the first middle die block 101B-1 and the second middle die block 101B-2 are adjacent and in vertical contact with each other, but may slide along the contact surface to be movable relative to each other. Also, the first middle die block 101B-1 is fixedly coupled to the lower die block 101C by bolting, or the like, and the second middle die block 101B-2 is fixedly coupled to the upper die block 101A by bolting, or the like. Accordingly, the first middle die block 101B-1 and the lower die block 101C may be integrally moved, and the second middle die block 101B-2 and the upper die block 101A may be integrally moved.

The dual slot die coater 100' further includes first and second fixing portions 140, 140' provided on the rear surface thereof. The first fixing portion 140 includes fastening the lower die block 101C and the first middle die block 101B-1, and fastening the second middle die block 101B-2 and the upper die block 101A. A plurality of first fixing portions 140 may be provided along the width direction of the dual slot die coater 100'.

The second fixing portion 140' fastens the first middle die block 101B-1 and the second middle die block 101B-2, which leads to fastening the lower die block 101C and the upper die block 101A. The second fixing portion 140' is installed with a predetermined level of assembly tolerance (in the range of approximately 300 μm to 500 μm) in consideration of the fact that the first middle die block 101B-1 and the second middle die block 101B-2 should be relatively movable. That is, in order to allow the first middle die block 101B-1 and the second middle die block 101B-2 to move forward or backward to be slidable while being fixed, the second fixing portion 140' is fixed so that movement of a predetermined level or more does not occur between the first middle die block 101B-1 and the second middle die block 101B-2, but fine or slight movement is allowed due to the assembly tolerance.

In the dual slot die coater 100', the two outlets 105a, 106a may be spaced apart from each other in a horizontal direction to be disposed in front and rear, if necessary. That is, a separate device for adjusting the shape of the dual slot die coater 100' may be used, or an operator may make the relative movement of the lower die block 101C and the upper die block 101A manually.

For example, in a state where the lower die block 101C is left without moving, the upper die block 101A may be moved along the sliding surface by a predetermined distance backward or forward opposite to the discharge direction of the coating solution, thereby forming a step between the lower outlet 106a and the upper outlet 105a. Here, the sliding surface means a surface opposite to the first middle die block 101B-1 and the second middle die block 101B-2.

The width of the step formed as described above may be determined within the range of approximately hundreds m to several mm, which may be determined according to the physical properties and viscosity of the first coating solution and the second coating solution formed on the substrate, or a desired thickness for each layer on the substrate. For example, as the thickness of the coating layer to be formed on the substrate increases, the width of the step may increase.

In addition, as the lower outlet 106a and the upper outlet 105a are disposed at positions spaced apart from each other in a horizontal direction, the second coating solution discharged from the upper outlet 105a does not flow into the lower outlet 106a, and the first coating solution discharged from the lower outlet 106a does not flow into the upper outlet 105a.

That is, the coating solution discharged through the lower outlet 106a or the upper outlet 105a is blocked by a surface forming the step formed between the lower outlet 106a and the upper outlet 105a, and thus the coating solution does not flow into the other outlet, whereby a smoother multi-layer active material coating process may be proceeded.

In the dual slot die coater 100' according to the second embodiment of the present disclosure as described above, when a relative position between the lower outlet 106a and the upper outlet 105a needs to be changed, it may be simply adjusted by sliding movement of the lower die block 101C and/or the upper die block 101A, and there is no need to disassemble and reassemble each of the die blocks 101A, 101B, 101C, thereby significantly improving processability.

Figure 13:
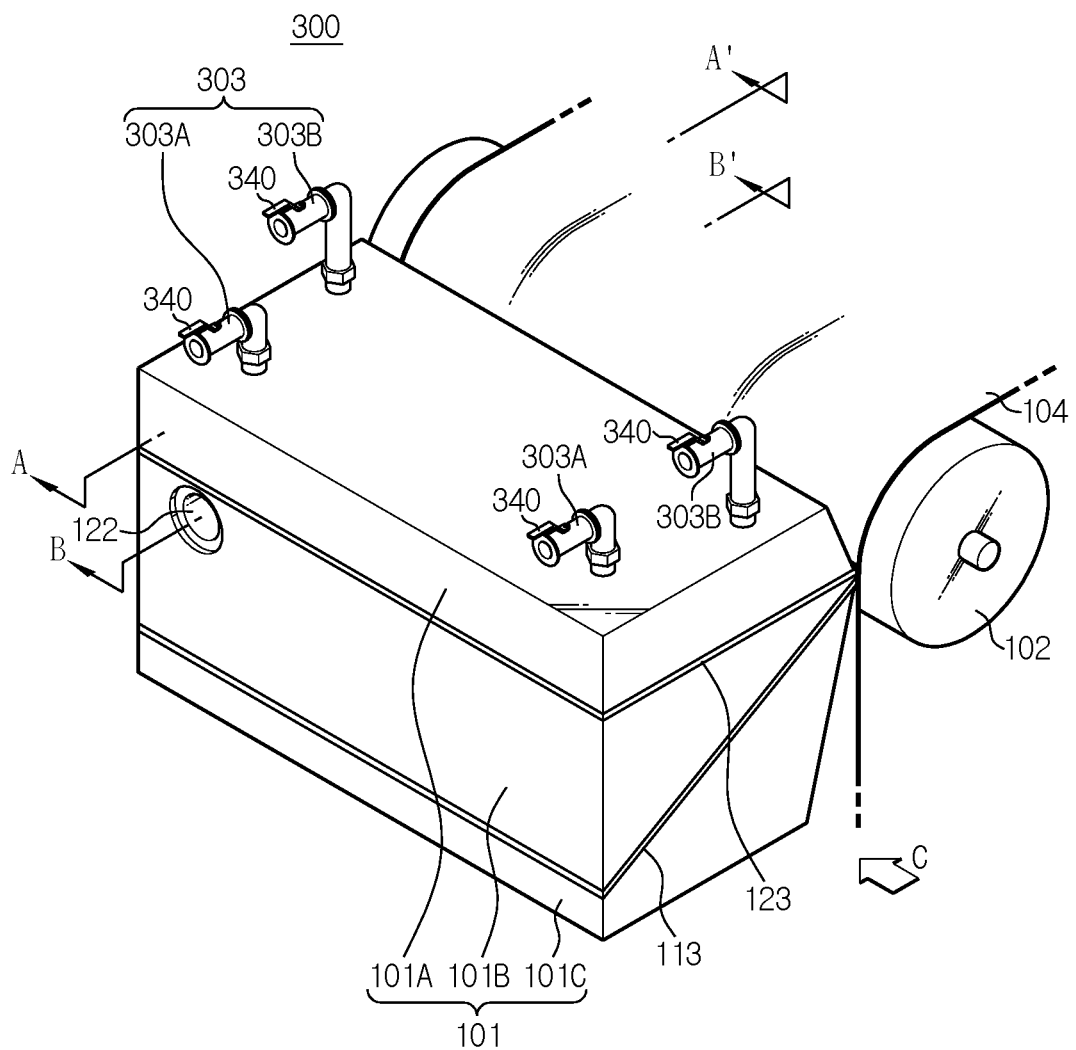
FIG. 13 is a schematic diagram illustrating a slot die coater according to a third embodiment of the present disclosure.
Figure 14:
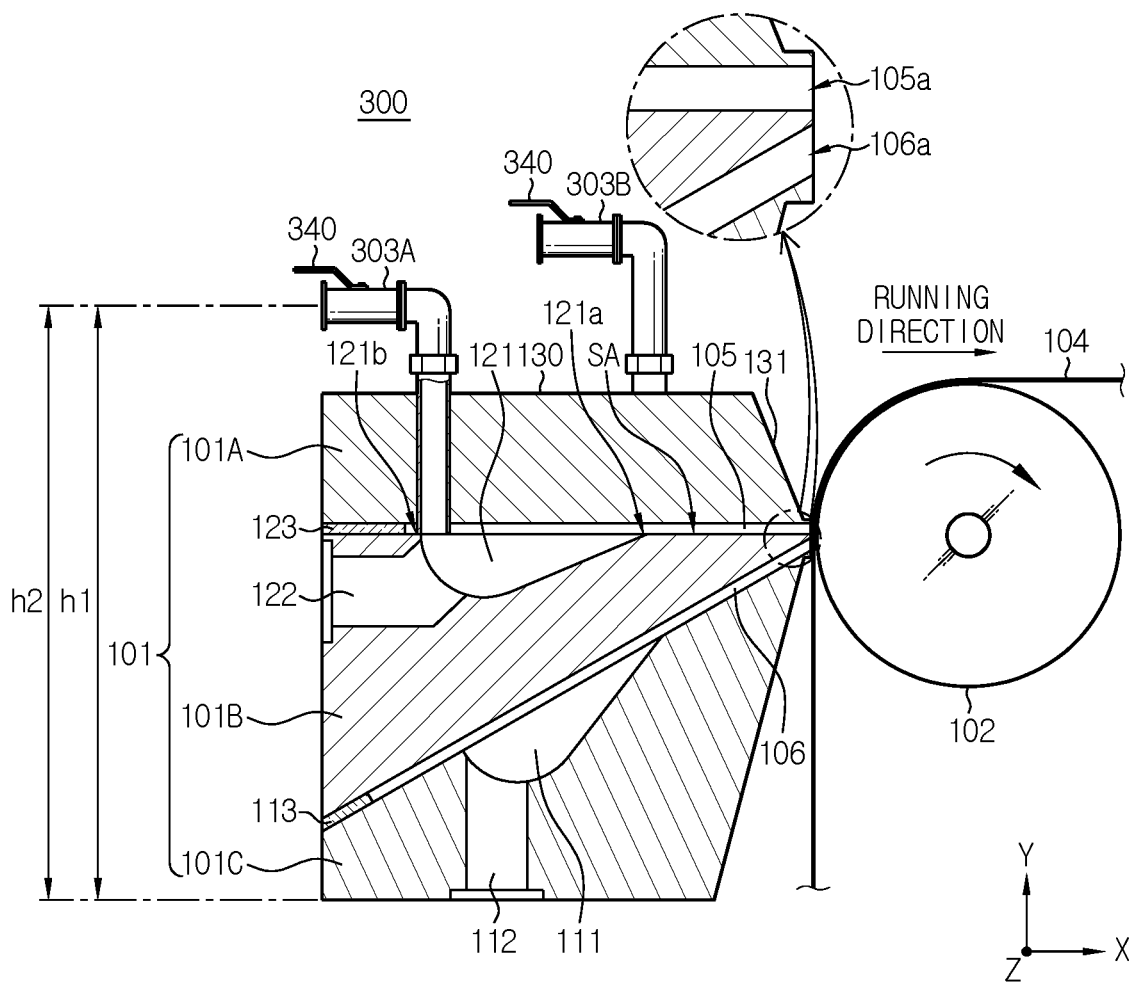
FIG. 14 is a vertical cross-sectional view taken along the dotted line A of FIG. 13 when viewed from the direction C.
Figure 15:
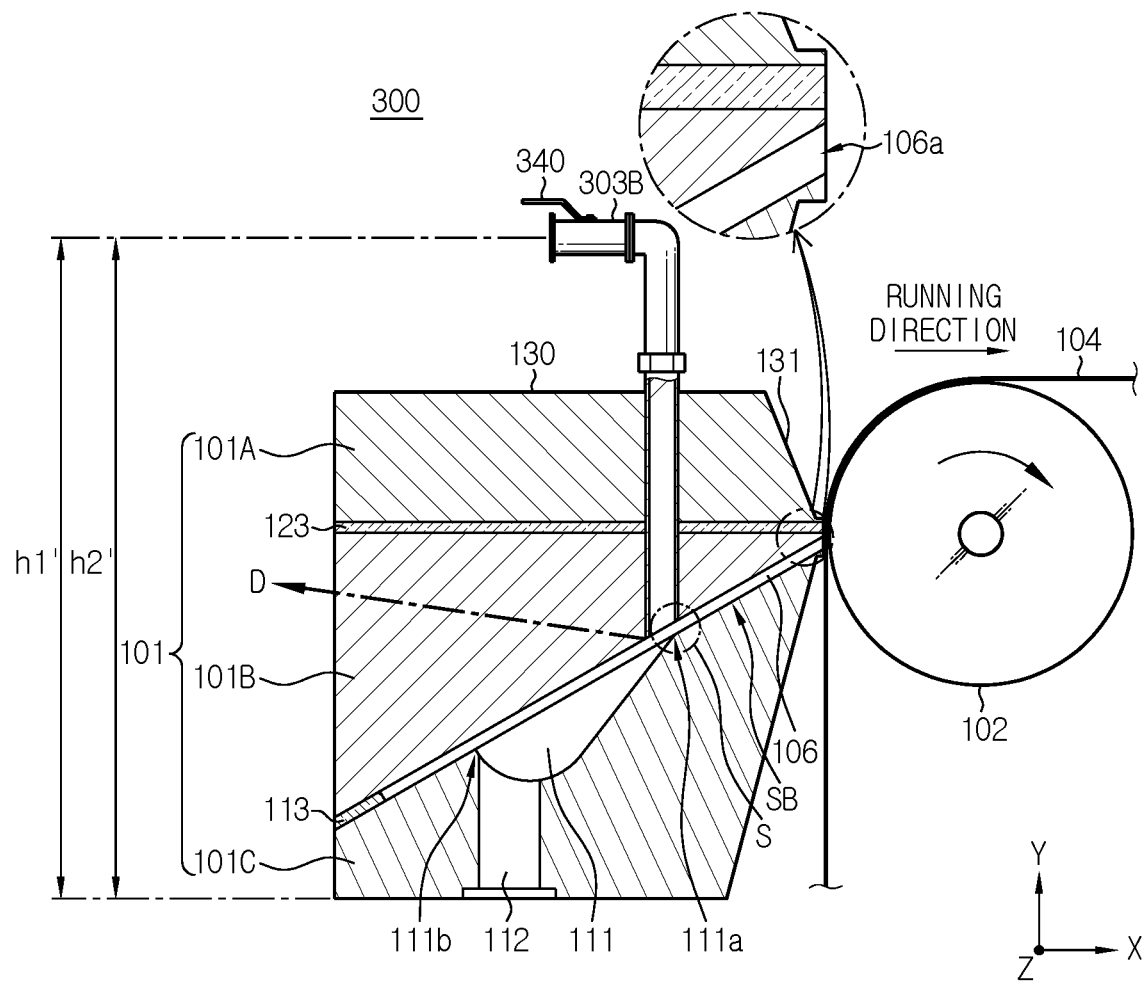
FIG. 15 is a vertical cross-sectional view taken along the dotted line B of FIG. 13 when viewed from the direction C.
Figure 16:
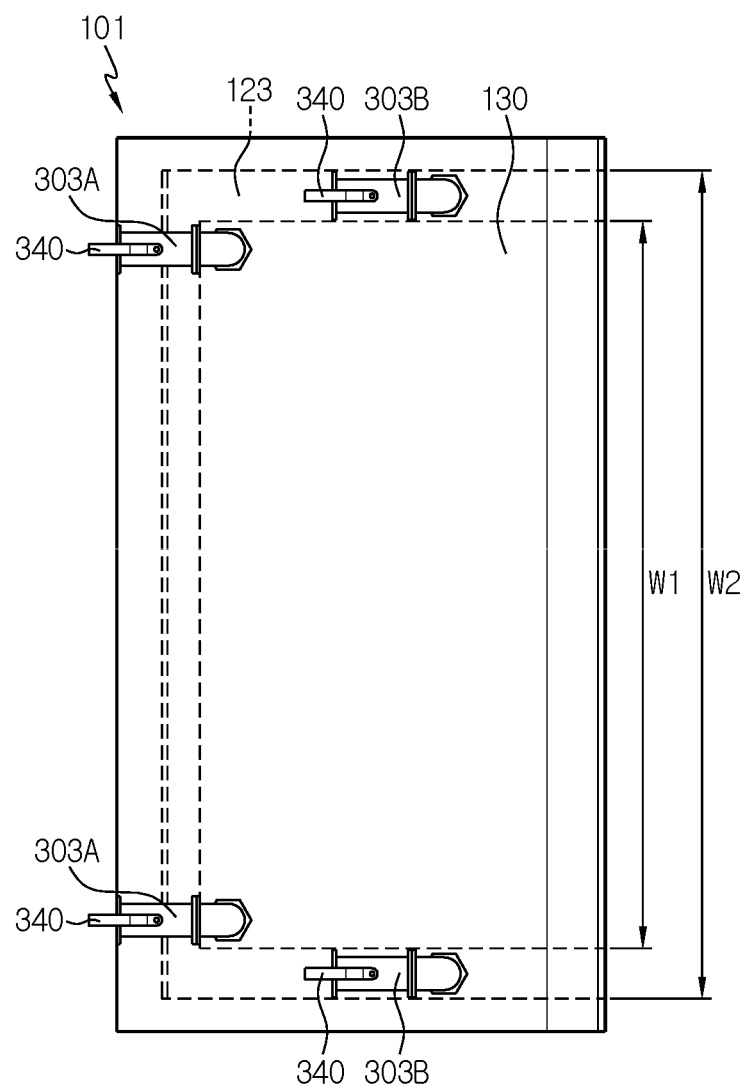
FIG. 16 is a plan view illustrating the slot die coater of FIG. 13.
Figure 17:
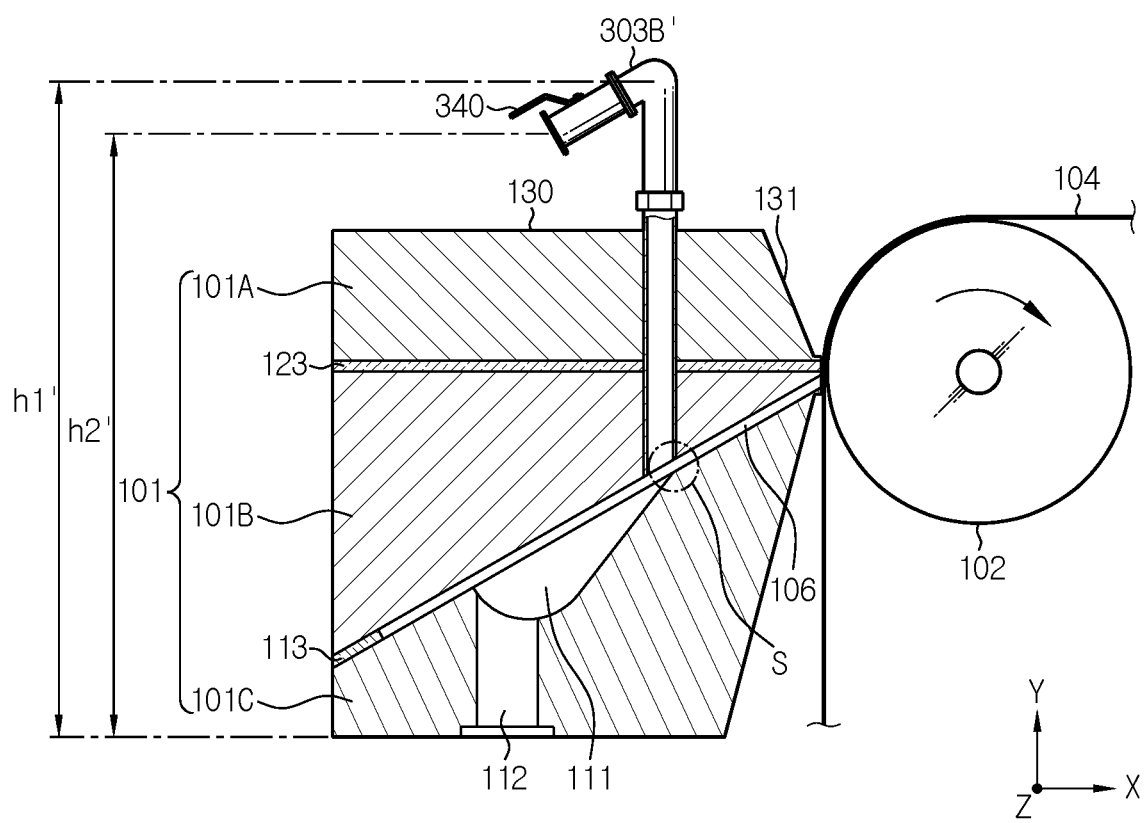
FIG. 17 is a diagram illustrating a hypothetical comparative example.

Hereinafter, a third embodiment and a comparative example of the present disclosure will be described with reference to FIGS. 13 to 17. FIG. 13 is a schematic diagram illustrating a slot die coater according to a third embodiment of the present disclosure. FIG. 14 is a vertical cross-sectional view taken along the dotted line A of FIG. 13 when viewed from the direction C. FIG. 15 is a vertical cross-sectional view taken along the dotted line B of FIG. 13 when viewed from the direction C. FIG. 16 is a plan view illustrating the slot die coater of FIG. 13. FIG. 17 is a diagram illustrating a hypothetical comparative example.

As a plan view illustrating the upper spacer of FIG. 14, reference may be made to FIG. 4 described above. As a plan view illustrating the lower spacer of FIG. 15, reference may be made to FIG. 6 described above. FIG. 7 is effective as a plan view illustrating that the upper spacer is positioned on the middle die block. FIG. 8 is effective as a plan view illustrating that the lower spacer is positioned on the lower die block.

The same reference numerals as in the first embodiment described above in the drawings represent the same members, so repeated descriptions of the same members will be omitted, and differences from the above-described first embodiment will be mainly described.

Referring first to FIGS. 13, 14 and 15, the dual slot die coater 300 includes an air vent 303. The air vent 103 includes an upper air vent 103A and a lower air vent 103B. Referring to FIG. 4 again, the lower air vent 303B passes through the through-hole 123b formed in the upper spacer 123.

First, the upper air vent 303A penetrates the upper die block 101A to communicate with the upper manifold 121, and particularly may be installed in the upper manifold 121. Accordingly, air bubbles contained in the second electrode active material slurry as the second coating solution in the upper manifold 121 may be removed through the upper air vent 303A. The second electrode active material slurry is discharged onto the substrate 104 through the upper outlet 105a after air bubbles are removed as described above. After making a hole in the upper die block 101A, the upper air vent 303A including a pipe may be installed in this hole. The pipe is hollow and is provided with a valve 340. The pipe may have a bent structure. The pipe itself may be bent, or a plurality of straight pipes may be connected, but the connecting portion may be bent.

For example, as illustrated, the upper air vent 303A may have a structure bent in a "¬" shape. When removing air bubbles contained in the electrode active material slurry having low viscosity, the air bubbles may be discharged together with the electrode active material slurry. At this time, the operator may easily receive the electrode active material slurry flowing down through the bent upper air vent 303A. Although only a structure bent in a "¬" shape is shown in FIGS. 13 and 14, the upper air vent 303A may be bent in various shapes as long as it may easily receive the flowing electrode active material slurry. In addition, the upper air vent 303A includes a valve 340. The valve 340 is not particularly limited as long as it has a structure capable of opening and closing a hollow pipe.

The upper air vent 303A provides a passage through which air in the upper manifold 121 and air in the air bubbles contained in the second electrode active material slurry may escape to the outside. Since the upper outlet 105a is formed in a direction parallel to the ground, the air bubbles contained in the second electrode active material slurry may be easily discharged to the outside through the upper air vent 303A regardless of the position of the upper manifold 121 with which the upper air vent 303A communicates. However, in order to efficiently remove air bubbles contained in the second electrode active material slurry, the upper air vent 303A is preferably installed in a direction perpendicular to the discharge direction of the second electrode active material slurry and opposite to the direction of gravity.

In particular, since the upper air vent 303A is configured in the flow path through which the second coating solution flows, positioning is important. In the present disclosure, the upper air vent 303A is installed in the upper manifold 121 so as to minimize interference in the flow path. That is, it is installed in another region outside the upper manifold 121, thereby not interfering with the flow of the second coating solution. Installation in the upper manifold 121 means that it is not installed in the upper land portion SA, which is a portion where the front end 121a placed at the upper outlet 105a among the ends of the upper manifold 121 and the upper outlet 105a are connected. In the present embodiment, the upper air vent 303A is installed adjacent to the rear end 121b opposite to the upper outlet 105a among the ends of the upper manifold 121. Referring to FIGS. 7 and 8 again, the portion marked with the upper air vent 103A is the position of the upper air vent 303A in this embodiment, and the portion marked with the lower air vent 103B is the position of the lower air vent 303B in this embodiment.

Referring to FIG. 15, the lower air vent 303B penetrates the upper die block 101A and the middle die block 101B to communicate with the lower manifold 111. Therefore, before the first electrode active material slurry, which is the first coating solution in the lower manifold 111, is discharged to the lower outlet 106a, the air bubbles contained in the first electrode active material slurry may be removed through the lower air vent 303B.

After making a hole in the lower die block 101A and the middle die block 101B, the lower air vent 303B including a pipe may be installed in this hole. The pipe is hollow and is provided with a valve 340. The pipe may have a bent structure. The pipe itself may be bent, or a plurality of straight pipes may be connected, but the connecting portion may be bent.

For example, as illustrated, the lower air vent 303B may have a structure bent in a "¬" shape. When removing air bubbles contained in the electrode active material slurry having low viscosity, the air bubbles may be discharged together with the electrode active material slurry. At this time, the operator may easily receive the electrode active material slurry flowing down through the bent lower air vent 303B. Although only a structure bent in a "¬" shape is shown in FIGS. 13, 14 and 15, the lower air vent 303B may be bent in various shapes as long as it may easily receive the flowing electrode active material slurry. In addition, the lower air vent 303B includes a valve 340. The valve 340 is not particularly limited as long as it has a structure capable of opening and closing a hollow pipe.

The lower air vent 303B provides a passage through which air in the lower manifold 111 and air in the air bubbles contained in the first electrode active material slurry may escape to the outside. Since the lower air vent 303B is configured in the flow path through which the first coating solution flows, positioning is important. In the present disclosure, it is preferable that the lower air vent 303B is installed in the lower manifold 111 so as to minimize interference in the flow path. That is, it is installed in another region outside the lower manifold 111, thereby not interfering with the flow of the first coating solution. Installation in the lower manifold 111 means that it is not installed in the lower land portion SB, which is a portion where the front end 111a placed at the lower outlet 106a among the ends of the lower manifold 111 and the lower outlet 106a are connected.

Since the lower outlet 106a is inclined at an angle of approximately 30 to 60 degrees with respect to the ground, and the first electrode active material slurry is supplied from the lower slurry supply port 112 to the lower manifold 111 in a direction opposite to the direction of gravity, the largest amount of air bubbles is generated at a S portion connected from the lower manifold 111 to the lower outlet 106a. Therefore, it is preferable that the lower air vent 303B is installed adjacent to the S portion.

The S portion is a region between the front end 111a of the lower manifold 111 and the lower land portion SB. Accordingly, the lower air vent 303B is installed adjacent to the S portion, but should not be installed in the lower land portion SB. Therefore, preferably, the lower air vent 303B is installed adjacent to the front end 111a of the lower manifold 111 among the ends of the lower manifold 111. In addition, in consideration of the inclined structure of the lower outlet 106a, it is preferable to maintain an angle between the lower air vent 303B and the lower outlet 106a at approximately 80 degrees to 150 degrees. In particular, when the lower air vent 303B is installed perpendicular to the bottom surface as illustrated by adjusting the angle formed by the lower air vent 303B and the lower outlet 106a, there is an advantage in that it can be installed in parallel with the upper air vent 303A, thereby reducing the interference with each other on the upper block die 101A, resulting in easy maintenance.

Referring to FIGS. 15, 8 and 16, the lower air vent 303B is preferably installed so as not to penetrate the upper outlet 105a and the upper manifold 121. If the lower air vent 303B penetrates a portion where the upper outlet 105a and the upper manifold 121 are formed, it may interfere with the flow of the second electrode active material slurry and air bubbles may be formed in the through portion. Therefore, it is preferable that the lower air vent 303B is formed through a position outside the second opening 123a of the upper spacer 123. For example, the length W1 of the second opening 123a of the upper spacer 123 is smaller than the length W2 of the first opening 113a of the lower spacer 113, so that the lower air vent 303B may be formed to penetrate the through-hole 123b of the upper spacer 123.

The lower air vents 303B may be respectively formed at portions close to the side surface of the upper die block 101A in the longitudinal direction of the upper die block 101A perpendicular to a direction in which the first electrode active material slurry is discharged. The position of the lower air vent 303B has the advantage of facilitating maintenance and repair of the dual slot die coater 100 without interfering with the movement of an operator.

In addition to the embodiment shown in FIG. 15, the lower air vent 303B may be formed in various directions. For example, the lower air vent 303B may be formed in a rearward direction penetrating the middle die block 101B (see D of FIG. 15).

In this case, since the lower air vent 303B does not penetrate the upper spacer 123, there is an advantage that it may be installed at various positions in the lateral direction. Also, the lower air vent 303B may be formed in a lateral direction.

In particular, the pipe in the upper air vent 303A or the lower air vent 303B is installed such that the height of the highest point among the heights in a direction opposite to the direction of gravity is less than or equal to the height of the valve 340. Preferably, both the upper air vent 303A and the lower air vent 303B are installed such that the height of the highest point among the heights in a direction opposite to the direction of gravity in the pipe is less than or equal to the height of the valve 340.

Referring to FIG. 14 again, the upper air vent 303A is bent in a "¬" shape, so that the height h1 of the highest point of the pipe is the same as the height h2 of the valve 340. Referring to FIG. 15, the lower air vent 303B is bent in a "¬" shape, so that the height h1' of the highest point of the pipe is the same as the height h2' of the valve 340.

FIG. 17 is a diagram illustrating a hypothetical comparative example. As shown in FIG. 17, the lower air vent 303B' is bent almost in an inverted V shape, so that the height h1' of the highest point of the pipe is greater than the height h2' of the valve 340.

The air vent provides a passage through which the air in the manifold and the air in the air bubbles contained in the coating solution included in the manifold may escape to the outside. If the air is not smoothly discharged from the air vent and becomes a trap, the effect of the air vent is degraded. As shown in FIG. 17, when the height h1' of the highest point of the pipe is greater than the height h2' of the valve 340, air may be trapped at the bent portion of the pipe.

The trapped air described above is difficult to remove. It may be possible to remove the air trapped therein by instantaneously discharging the coating solution at a large pressure and high flow rate, but it is not preferable because the removal conditions are difficult and the loss of the coating solution may be large.

As proposed in the present disclosure, when both the upper air vent 303A and the lower air vent 303B are installed so that the height of the highest point among the heights in a direction opposite to the direction of gravity in the pipe is less than or equal to the height of the valve 340, that is, when the height from the pipe to the valve 340 is the same as the valve 340 or the valve 340 is located at the highest point, it is possible to prevent air from being trapped in the pipe.

Figure 18:
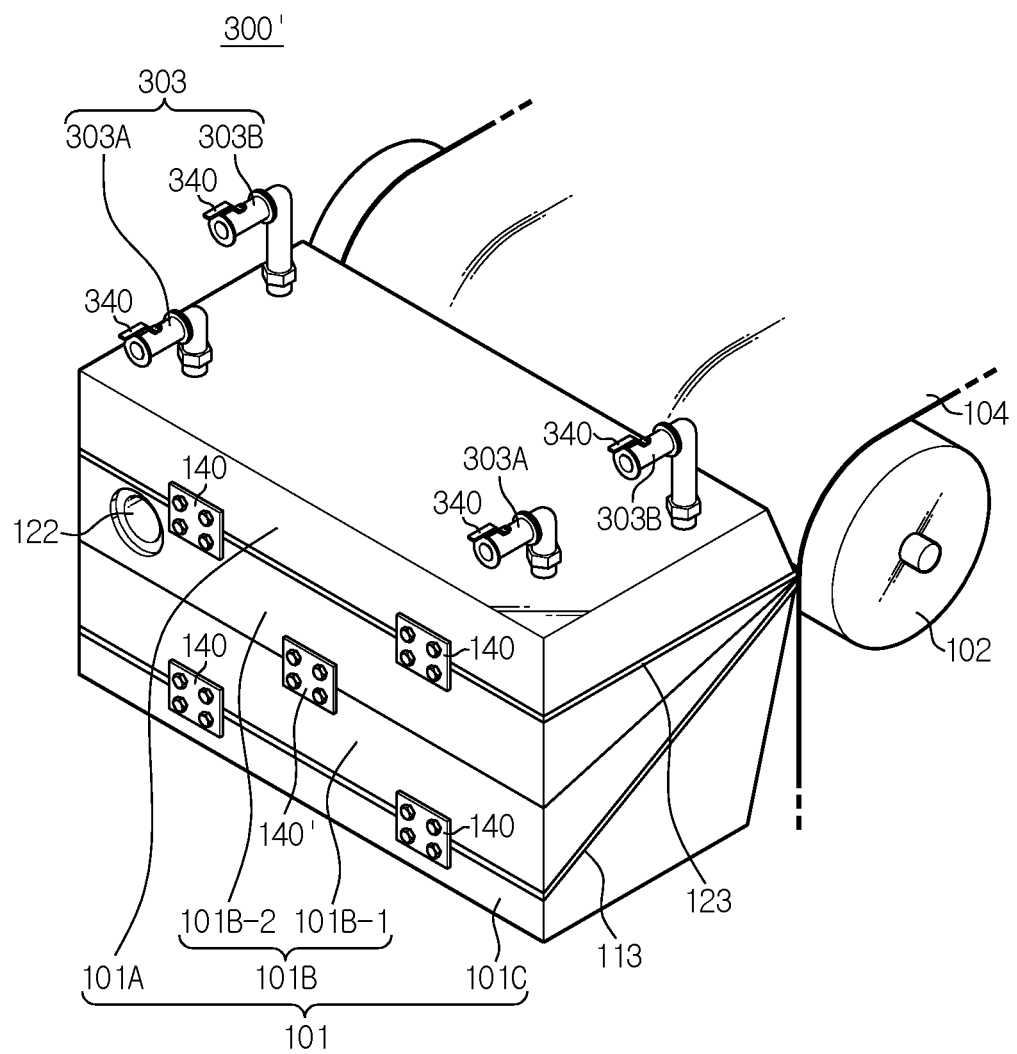
FIG. 18 is a schematic diagram illustrating a slot die coater according to a fourth embodiment of the present disclosure as a modified example of FIG. 13.

Next, a dual slot die coater 300' according to a fourth embodiment of the present disclosure will be described with reference to FIG. 18. The same reference numerals as in the first to third embodiments described above represent the same members, so repeated descriptions of the same members will be omitted.

In the third embodiment described above, since the middle die block 101B is formed of one block, the relative positions of the upper outlet 105a and the lower outlet 106a may not be variably adjusted. However, according to the fourth embodiment of the present disclosure, the relative positions of the upper outlet 105a and the lower outlet 106a may be easily adjusted. This relative position adjustment is the same as the position adjustment in the second embodiment described above.

The present disclosure has been described in detail. However, it should be understood that the detailed description and specific examples, while indicating preferred embodiments of the present disclosure, are given by way of illustration only, since various changes and modifications within the scope of the present disclosure defined by the appended claims will become apparent to those skilled in the art from this detailed description.

What is claimed is:

1. A dual slot die coater for extruding and applying a coating solution to a surface of a substrate, comprising:
   die blocks comprising a first outer die block, an intermediate die block disposed adjacent to the first outer die block to form a first slot between the intermediate die block and the first outer die block, and a second outer die block disposed adjacent to the intermediate die block to form a second slot between the second outer die block and the intermediate die block;
   a first manifold that accommodates a first coating solution as a recessed chamber provided in the first outer die block or the intermediate die block and communicates with the first slot, and a second manifold that accommodates a second coating solution as a recessed chamber provided in the intermediate die block or the second outer die block and communicates with the second slot; and
   a first air vent in communication with the first manifold, and a second air vent in communication with the second manifold,
   wherein the first outer die block, the intermediate die block, and the second outer die block respectively comprises a first outer die lip, an intermediate die lip, and a second outer die lip, which respectively forms the front end of each of the first outer die block, the intermediate die block, and the second outer die block, wherein a first outlet communicating with the first slot is formed between the first outer die lip and the intermediate die lip, and a second outlet communicating with the second slot is formed between the intermediate die lip and the second outer die lip, and
   wherein the first air vent is installed adjacent to a front end of the first manifold without being installed at a first land portion that is a portion where the front end placed on the first outlet side and the first outlet are connected.

2. A dual slot die coater for extruding and applying a coating solution to a surface of a substrate, comprising:
   die blocks comprising a first outer die block, an intermediate die block disposed adjacent to the first outer die block to form a first slot between the intermediate die block and the first outer die block, and a second outer die block disposed adjacent to the intermediate die block to form a second slot between the second outer die block and the intermediate die block;
   a first manifold that accommodates a first coating solution as a recessed chamber provided in the first outer die block or the intermediate die block and communicates with the first slot, and a second manifold that accommodates a second coating solution as a recessed chamber provided in the intermediate die block or the second outer die block and communicates with the second slot; and
   a first air vent installed through at least one of the die blocks to communicate with the first manifold, and a second air vent installed through at least one of the die blocks to communicate with the second manifold,
   wherein the first air vent or the second air vent comprises a pipe forming a channel and a valve, wherein the pipe has a height having a highest point in a direction opposite the direction of gravity equal to or less than a height of the valve,
   wherein the first outer die block, the intermediate die block, and the second outer die block respectively comprises a first outer die lip, an intermediate die lip, and a second outer die lip, which respectively forms the front end of each of the first outer die block, the intermediate die block, and the second outer die block, wherein a first outlet communicating with the first slot is formed between the first outer die lip and the intermediate die lip, and a second outlet communicating with the second slot is formed between the intermediate die lip and the second outer die lip, and
   wherein the first air vent is installed adjacent to a front end of the first manifold without being installed at a first land portion that is a portion where the front end placed on the first outlet side and the first outlet are connected.

3. The dual slot die coater according to claim 1,
wherein the first air vent or the second air vent comprises a valve.

4. The dual slot die coater according to claim 1,
wherein the first air vent is provided through the second outer die block and the intermediate die block, and the second air vent is provided through the second outer die block.

5. The dual slot die coater according to claim 1,
wherein the first air vent or the second air vent has a bent structure.

6. The dual slot die coater according to claim 1,
wherein
the second air vent is formed adjacent to the front end of the second manifold without being installed at a second land portion that is a portion where the front end placed on the second outlet side and the second outlet are connected.

7. The dual slot die coater according to claim 1,
wherein
the second air vent is installed adjacent to a rear end of the second manifold, which is placed opposite to the second outlet.

8. The dual slot die coater according to claim 1,
wherein the intermediate die block has a right-angled triangular shape in a cross-section along a direction in which the substrate travels, and the first manifold is provided in the first outer die block and the second manifold is provided in the intermediate die block.

9. The dual slot die coater according to claim 7,
wherein the first manifold comprises a first coating solution supply port communicating with a first coating solution supply chamber, and the second manifold comprises a second coating solution supply port communicating with a second coating solution supply chamber, wherein the first coating solution supply port is provided at a bottom of the first outer die block, and the second coating solution supply port is provided at a rear surface of the intermediate die block.

10. The dual slot die coater according to claim 1,
further comprising a first spacer interposed between the first outer die block and the intermediate die block to adjust a width of the first slot, and a second spacer interposed between the intermediate die block and the second outer die block to adjust a width of the second slot.

11. The dual slot die coater according to claim 10,
wherein the first spacer and the second spacer comprise an opening to determine a coating width of a coating layer applied on the substrate, and the first air vent is installed through the second spacer.

12. The dual slot die coater according to claim 1,
wherein the intermediate die block comprises a first intermediate die block and a second intermediate die block that are in face-to-face contact with each other and are configured to slide along a contact surface to relative to each other,
wherein the first intermediate die block is fixedly coupled to the first outer die block, and the second intermediate die block is fixedly coupled to the second outer die block.

13. The dual slot die coater according to claim 2,
wherein the first air vent is provided through the second outer die block and the intermediate die block, and the second air vent is provided through the second outer die block.

14. The dual slot die coater according to claim 2,
wherein the first air vent or the second air vent has a bent structure.

15. The dual slot die coater according to claim 2,
wherein
the second air vent is formed adjacent to a front end of the second manifold without being installed at a second land portion that is a portion where the front end placed on the second outlet side and the upper outlet are connected.

16. The dual slot die coater according to claim 2,
wherein
the second air vent is installed adjacent to a rear end of the second manifold, which is placed opposite to the second outlet.

17. The dual slot die coater according to claim 2,
wherein the intermediate die block has a right-angled triangular shape in a cross-section along a direction in which the substrate travels, and the first manifold is provided in the first outer die block and the second manifold is provided in the intermediate die block.

18. The dual slot die coater according to claim 2,
which further comprises a first spacer interposed between the first outer die block and the intermediate die block to adjust a width of the first slot, and a second spacer interposed between the intermediate die block and the second outer die block to adjust a width of the second slot.

19. The dual slot die coater according to claim 2,
wherein the intermediate die block comprises a first intermediate die block and a second intermediate die block that are in face-to-face contact with each other and are configured to slide along a contact surface to move relative to each other,
wherein the first intermediate die block is fixedly coupled to the first outer die block, and the second intermediate die block is fixedly coupled to the second outer die block.

20. A dual slot die coater for extruding and applying a coating solution to a surface of a substrate, comprising:
die blocks comprising a first outer die block, an intermediate die block disposed adjacent to the first outer die block to form a first slot between the intermediate die block and the first outer die block, and a second outer die block disposed adjacent to the intermediate die block to form a second slot between the second outer die block and the intermediate die block;
a first manifold that accommodates a first coating solution as a recessed chamber provided in the first outer die block or the intermediate die block and communicates with the first slot, and a second manifold that accommodates a second coating solution as a recessed chamber provided in the intermediate die block or the second outer die block and communicates with the second slot; and
a first air vent in communication with the first manifold, and a second air vent in communication with the second manifold,
wherein the intermediate die block comprises a first intermediate die block and a second intermediate die block that are in face-to-face contact with each other and are configured to slide along a contact surface and configured to move relative to each other.

* * * * *